United States Patent
Shirakyan

(10) Patent No.: US 11,146,744 B2
(45) Date of Patent: Oct. 12, 2021

(54) AUTOMATED INTERACTIVE SYSTEM AND METHOD FOR DYNAMICALLY MODIFYING A LIVE IMAGE OF A SUBJECT

(71) Applicant: Emergent Machines, Inc., Kirkland, WA (US)

(72) Inventor: Grigor Shirakyan, Kirkland, WA (US)

(73) Assignee: Emergent Machines, Inc., Kirkland, WA (US)

( * ) Notice: Subject to any disclaimer, the term of this patent is extended or adjusted under 35 U.S.C. 154(b) by 0 days.

(21) Appl. No.: 16/799,560

(22) Filed: Feb. 24, 2020

(65) Prior Publication Data

US 2020/0195860 A1 Jun. 18, 2020

Related U.S. Application Data

(63) Continuation-in-part of application No. 15/823,308, filed on Nov. 27, 2017, now Pat. No. 10,694,097.

(60) Provisional application No. 62/810,110, filed on Feb. 25, 2019, provisional application No. 62/426,950, filed on Nov. 28, 2016.

(51) Int. Cl.
*H04N 5/272* (2006.01)
*H04N 5/232* (2006.01)
*H04N 5/262* (2006.01)
*H04N 5/225* (2006.01)

(52) U.S. Cl.
CPC ........... *H04N 5/272* (2013.01); *H04N 5/2257* (2013.01); *H04N 5/23222* (2013.01); *H04N 5/2621* (2013.01)

(58) Field of Classification Search
CPC .. H04N 5/272; H04N 5/23222; H04N 5/2257; H04N 5/2621; H04N 9/75; H04N 5/2251
See application file for complete search history.

(56) References Cited

U.S. PATENT DOCUMENTS

| | | | | |
|---|---|---|---|---|
| 8,300,890 | B1* | 10/2012 | Gaikwad | G06K 9/00771 382/103 |
| 2013/0286408 | A1* | 10/2013 | Castillo | G01B 11/272 356/610 |
| 2015/0302570 | A1* | 10/2015 | Shirakyan | G06T 7/50 348/46 |
| 2020/0265623 | A1* | 8/2020 | Gupta | G06T 11/60 |

* cited by examiner

*Primary Examiner* — Padma Haliyur
(74) *Attorney, Agent, or Firm* — Law Office of Mark A. Thomas

(57) ABSTRACT

A system and method for dynamically modifying a live image of a subject using an automated interactive system is provided. The system includes a motorized platform including at least one actuator, a control unit including a processor and a storage device, and a payload including one or more sensors and a camera. The method includes (i) collecting sensor data about at least one of the subject and an environment, (ii) moving the camera along or around at least one degree of freedom, (iii) capturing the live image of the subject in at least one position from with the camera, (iv) storing the live image of the subject in the data storage device, (v) sending instructions to physically move the payload, (vi) applying at least one environment modification rule to modify the live image of the subject, and (vii) displaying a modified live image of the subject on a display unit.

20 Claims, 32 Drawing Sheets

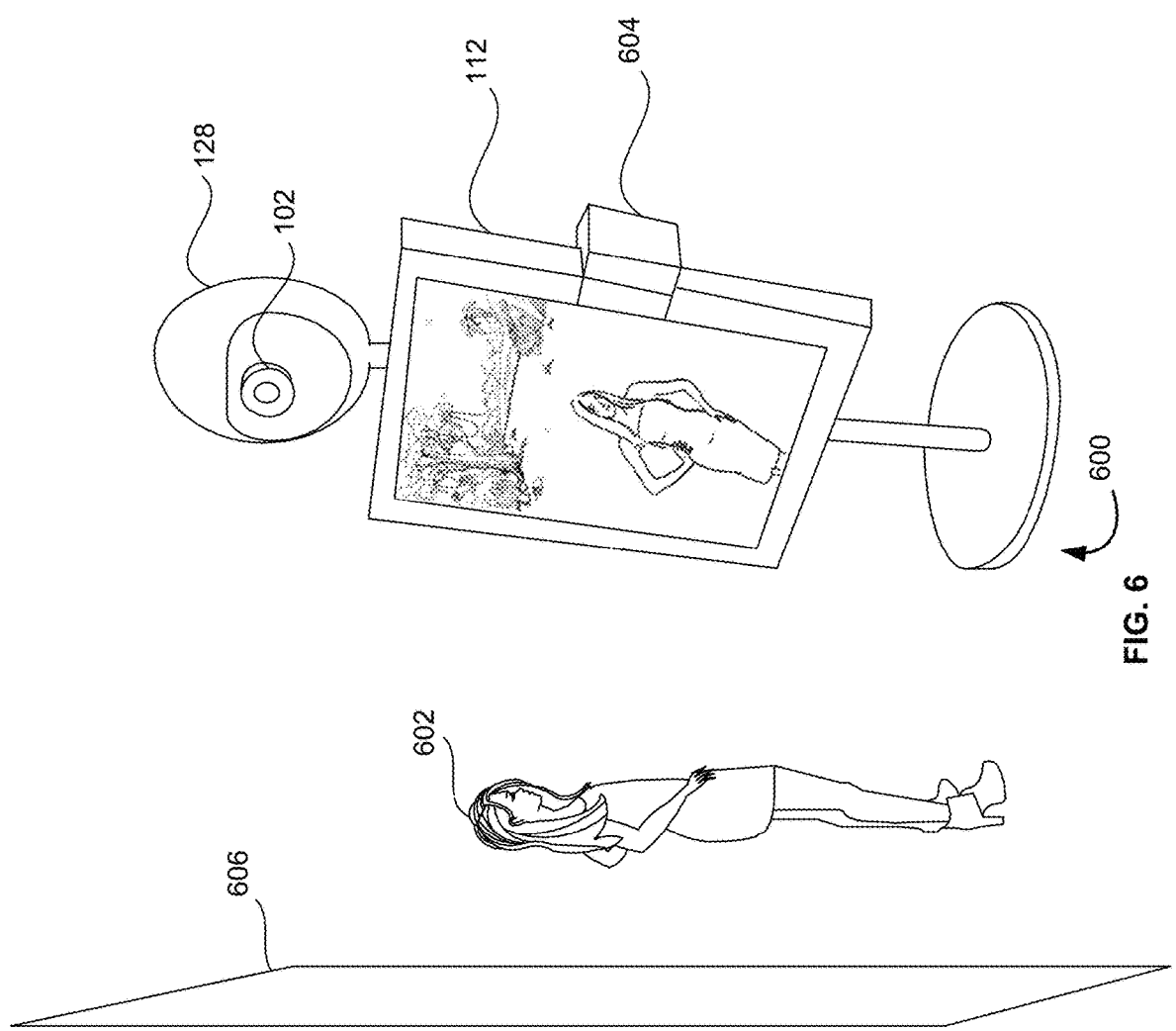

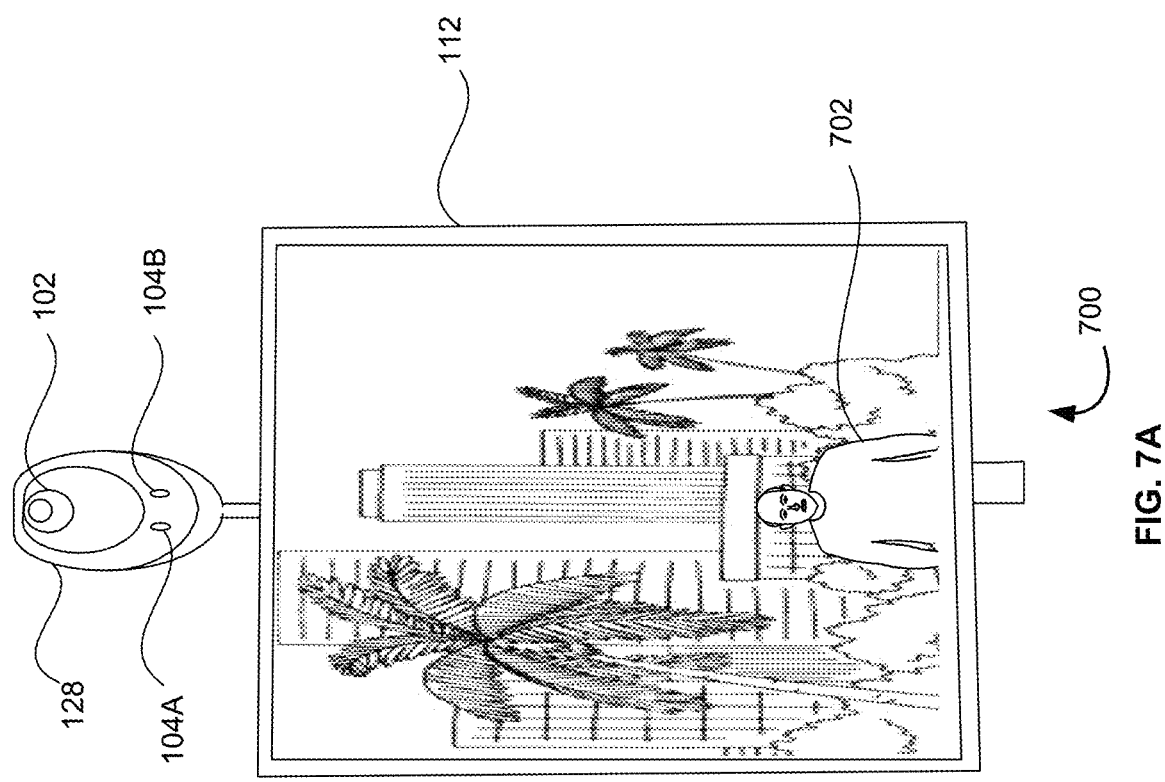

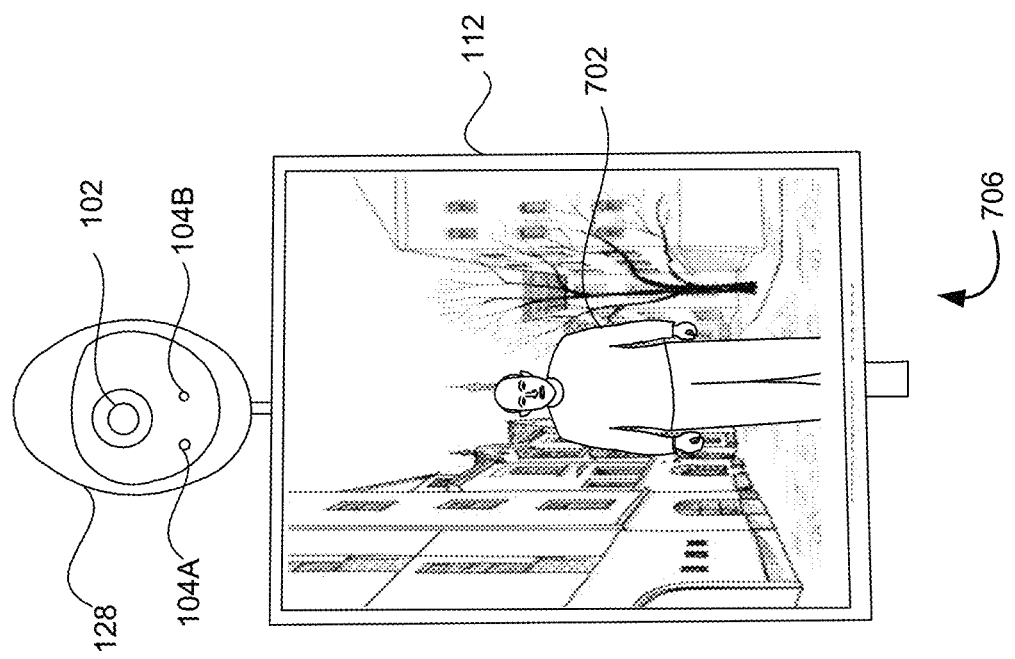

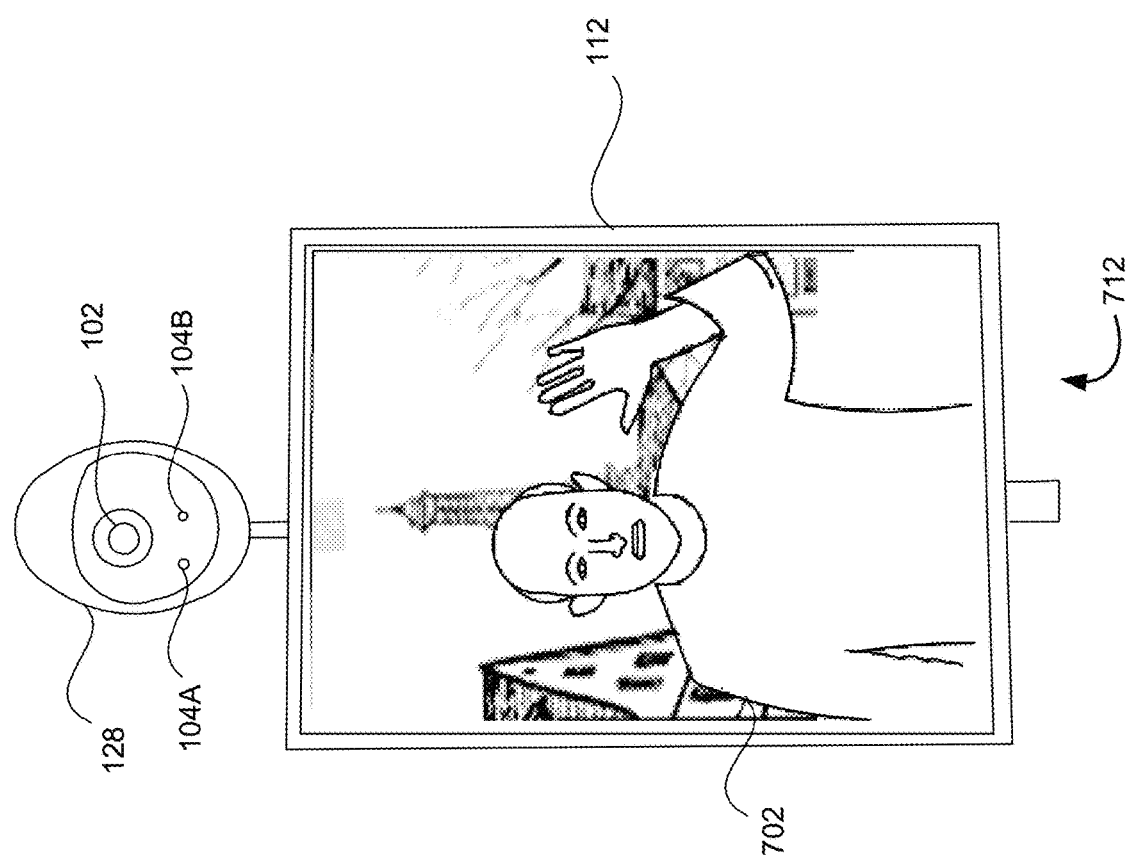

AUTOMATED INTERACTIVE SYSTEM AND METHOD FOR DYNAMICALLY MODIFYING A LIVE IMAGE OF A SUBJECT

CROSS-REFERENCE TO RELATED APPLICATIONS

This patent application claims priority to U.S. provisional patent application Ser. No. 62/810,110, filed on Feb. 25, 2019, U.S. non-provisional patent application Ser. No. 15/823,308, filed on Nov. 27, 2017, and U.S. provisional patent application Ser. No. 62/426,950 filed on Nov. 28, 2016, the complete disclosures of which, in their entireties, are hereby incorporated by reference.

BACKGROUND

Technical Field

Embodiments of this disclosure generally relate to automated interactive photography to capture still images and motion-depicting videos, and more particularly, to an automated interactive system for dynamically modifying live images of a subject captured using an automated photo booth.

Description of the Related Art

A photo booth enables users to get their photographs taken. Photo booths are commonly used at event venues for entertainment purposes. One drawback with existing photo booths is that the camera is fixed. Hence, users have to position themselves within a specific focus area corresponding to depth of field in order to be captured by the camera, instead of in their natural state. When the user moves away from the focus area, the camera of the photo booth fails to capture an acceptably clear image of the user. Consequently, all photographs of subjects taken with a fixed camera typically have the same background at a fixed distance, leading to a lack of variety.

Another drawback with existing photo booths is their use of physical backgrounds called backdrops that are installed in the environment and digital overlays sometimes referred to as watermarks that are digitally applied to photographs for variety. Physical backdrops are static and have to be changed manually, requiring human intervention that is often unavailable and/or not cost effective. Of course users may edit/change the captured images using post processing applications such as Microsoft office Paint, Adobe Photoshop, etc. after the images are captured, but that is often cumbersome and expensive. Accordingly, there remains a need for a system and method for mitigating and/or overcoming drawbacks associated with current photo booths.

SUMMARY

In view of the foregoing, embodiments herein provide an automated interactive system for dynamically modifying a live image of a subject. The automated interactive system includes a motorized platform and a control unit. The motorized platform includes at least one actuator that is capable of rotating or translating a payload including at least one sensor and a camera. The at least one sensor is adapted to collect sensor data about at least one of the subject and an environment. The camera is adapted to capture the live image of the subject in an at least one position. The at least one actuator moves the camera along or around at least one degree of freedom of that is selected from at least one of (i) rotating the camera around horizontal axis, (ii) rotating the camera around vertical axis, (iii) moving the camera parallel to the vertical axis and (iv) moving the camera parallel to the horizontal axis. The control unit includes a processor and a physical data storage device containing computer-executable instructions that, when executed by the processor, cause the processor to (i) capture the live image of the subject in the at least one position with the camera, (ii) store the live image of the subject in the data storage device, (iii) send instructions to the at least one actuator to physically move the payload based at least in part on the sensor data, (iv) apply at least one environment modification rule that is performed by an environment rules engine to dynamically modify the live image of the subject in the at least one position with an at least one layer into a modified live image and (v) display the modified live image of the subject on a display unit.

In some embodiments, the at least one layer is at least one of (i) a background layer and (ii) a foreground layer of the live image of the subject in the at least one position.

In some embodiments, the environment rules engine applies the at least one layer to the live image by (i) identifying the subject in the live image of the subject, (ii) determining pixels that correspond to the subject in the live image of the subject, (iii) determining pixels that correspond to the environment in the live image, (iv) removing or replacing the pixels corresponding to the environment of the live image without removing the pixels corresponding to the subject using at least one Artificial Intelligence (AI) enabled background removal technique or a Chroma Keying background replacement technique and (v) applying the at least one layer on the live image of the subject.

In some embodiments, the environment rules engine applies the at least one layer on top of pixels that corresponds to at least one of (i) a background and (ii) a foreground of the live image of the subject.

In some embodiments, the modified live image comprises at least one of (i) the fore ground layer applied on the foreground of the subject, (ii) a live view layer that corresponds to the subject and (iii) the background layer applied on the background of the subject, wherein the foreground layer, the live view layer and the background layer are stacked on top of each other.

In some embodiments, at least some pixels that correspond to the at least one layer are part of at least one transparent region.

In some embodiments, the sensor data includes information of (i) a distance of the subject from the camera, (ii) a movement, (iii) a position, (iv) a gesture, (v) a pose, (vi) an action, (vii) a sound and (viii) a facial expression of the subject and information about the environment that includes color, scenery, obstacles, lighting around the subject.

In some embodiments, the at least one sensor is selected from a depth sensor, a Red Green Blue (RGB) sensor, a video camera, a RGB camera, a depth and stereo camera, a far infrared sensor, an infrared and ultrasound proximity sensor, a weight sensor, a pressure sensor, a sound sensor, a motion sensor, Global Positioning System (GPS), a global positioning solution, a local positioning solution, a light sensor, a magnetic sensor, and a gyroscope.

In some embodiments, the instructions cause the processor to hide or dynamically display the at least one layer on the live image of the subject based at least in part on the sensor data comprises the movement of the subject detected by the at least one sensor.

In some embodiments, the instructions cause the processor to change a priority order of the background layer and the foreground layer on the live image of the subject based on the distance of the subject detected by the at least one sensor.

In some embodiments, the processor causes the display unit to display the at least one foreground layer that was previously on top of the live image of the subject as the at least one background layer if the distance of the subject detected by the at least one sensor is less from the camera.

In some embodiments, the instructions cause the processor to dynamically move the at least one layer relative to the live image based on the position of the subject in a physical environment while using the motorized platform to maintain at least a portion of the live image of the subject in the center of a live view.

In some embodiments, the instructions cause the processor to dynamically apply a digital zoom to the at least one layer based on the distance of the subject from the camera while using the motorized platform to maintain the subject in the center of the live view.

In some embodiments, the at least one layer supports a scale mapping function.

In some embodiments, the scale mapping function decides which portion of the at least one layer is displayed on the live image.

In some embodiments, the at least one layer is selected from at least one of an image, an animated image, a video and an Animated Portable Network Graphics (APNG) file.

In some embodiments, if applying the at least one environment modification rule, the control unit processes the sensor data from the at least one sensor to continuously track the position of the subject to maintain at least a portion of the live image of the subject in a center of a frame.

In some embodiments, if the subject moves in at least one direction on a physical scene, the processor moves in the at least one degree of freedom of the motorized platform to track the subject and maintain at least of portion of the live image of the subject in the center of the frame and move the at least one layer in a direction that is opposite to the direction of the subject.

In some embodiments, if the subject moves in the at least one direction on the physical scene, the processor moves in the at least one degree of freedom of the motorized platform to track the subject and maintain at least of portion of the live image of the subject in the center of the frame and move the at least one layer in same direction of the subject.

In some embodiments, display of the at least one layer is controlled by a layer setting selected from at least one of (i) layer tilt motion speed and (ii) layer pan motion speed.

In some embodiments, the at least one layer comprises at least one layer mapping function that maps the subject's position in a physical environment to a position of the at least one layer on a screen of the display unit.

In some embodiments, the at least one layer mapping function maintains the at least one layer on the screen of the display unit for at least one of (i) a predetermined time and (ii) a predetermined number of photo shooting sessions.

In some embodiments, if the subject crosses a predetermined threshold on the physical scene, the at least one layer mapping function displays the at least one layer on the screen of the display unit by at least one of (i) scrolling the at least one layer, and (ii) hiding the at least one layer by displaying a second layer instead of the at least one layer.

In some embodiments, the environment rules engine continuously slides each layer on the live image of the subject.

In some embodiments, the environment rules engine continuously slides a specific layer and maintains other layers stationary on the live image of the subject.

In some embodiments, the camera and the at least one sensor are mounted on a shell that is controlled using the at least one actuator.

In some embodiments, the instructions cause the processor to determine a modality of operation of the camera based on at least one of (i) a position of the shell and (i) the subject's position.

In some embodiments, the modality of operation includes capturing at least one of (i) a still photo and (ii) a video of the subject.

In some embodiments, the camera captures the live image of the subject in the at least one position based on at least one control indicator that is generated by the control unit.

In some embodiments, the instructions cause the processor to control movement of the camera and the payload in a "portrait-landscape" axis using a roll actuator based on a subject's height.

In some embodiments, if the subject moves to at least one direction from the center of the frame across the horizontal axis, the control unit turns the camera and the payload in the at least one direction using a pan actuator to maintain at least of portion of the live image of the subject in the center of the frame.

In some embodiments, if the subject moves away from the center of the frame across the vertical axis, the control unit turns the camera and the payload based at least in part on the sensor data from the at least one sensor using the tilt actuator to maintain the subject's face at a predetermined distance from a top of the frame.

In some embodiments, the instructions cause the processor to determine a speed of scrolling of the layer based on at least one pixel dimension of the layer image corresponding to the at least one layer.

In one aspect, in some embodiments, a method for dynamically modifying a live image of a subject using an automated interactive system is provided. The automated interactive system includes a motorized platform and a control unit. The motorized platform includes at least one actuator that is capable of rotating or translating a payload including at least one sensor and a camera. The control unit includes a processor and a physical data storage device containing computer-executable instructions. The method includes (i) collecting, using the at least one sensor, sensor data about at least one of the subject and an environment, (ii) moving, using the at least one actuator, the camera part of the payload along or around at least one degree of freedom that is selected from at least one of (a) rotating the camera around horizontal axis, (b) rotating the camera around vertical axis, (c) moving the camera parallel to the vertical axis, and (d) moving the camera parallel to the horizontal axis, (iii) capturing, by the processor, the live image of the subject in at least one position with the camera, (iv) storing, by the processor, the live image of the subject in the data storage device, (v) sending, by the processor, instructions to the at least one actuator to physically move the payload based at least in part on the sensor data, (vi) applying, by the processor, at least one environment modification rule that is performed by an environment rules engine to modify the live image of the subject in the at least one position with at least one layer into a modified live image and (vii) displaying, by the processor, the modified live image of the subject on a display unit.

In some embodiments, the at least one layer is at least one of (i) a background layer and (ii) a foreground layer of the live image of the subject in the at least one position.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is an exemplary perspective view of capturing the live image of the subject and dynamically modifying the live image of the subject using the automated interactive system of FIG. 1 according to some embodiments herein;

FIGS. 7A-7F illustrate exemplary planar views of capturing live images of a user in different positions and modifying the live images based on the different positions using the automated interactive system of FIG. 1 according to some embodiments herein;

DETAILED DESCRIPTION OF PREFERRED EMBODIMENTS

Figure 1A:
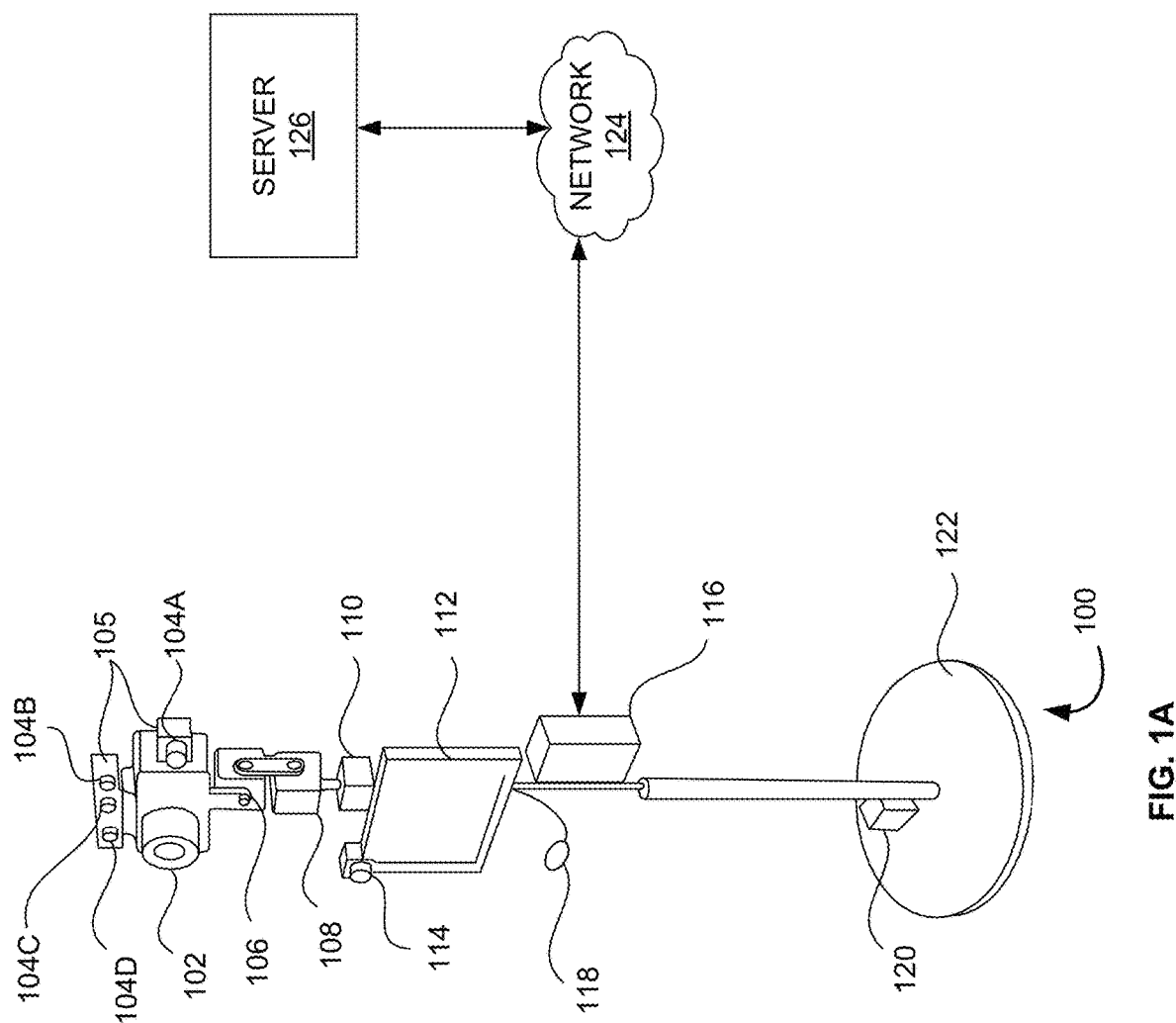
FIG. 1A is a block diagram that illustrates an automated interactive system according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for providing more variety and interactivity in a photo booth with minimum manual intervention to get a variety of photographs that appear more entertaining, interesting and/or more attractive to the end user. The embodiments herein provide variety and interactivity by modifying an image of a subject in response to a subject's position in a physical environment. Referring now to the drawings, and more particularly to FIGS. 1 through 14, preferred embodiments are shown, where similar reference characters denote corresponding features consistently throughout the figures.

FIG. 1A is a block diagram that illustrates an automated interactive system 100 according to some embodiments herein. The automated interactive system 100 includes a camera 102, sensors 104A-D mounted a motorized platform 105, actuators such as a roll actuator 106, a tilt actuator 108, a pan actuator 110, a display unit 112, a fixed position sensor 114, a control unit 116, a microphone 118, an elevation actuator 120 and a stand 122. The automated interactive system 100 further includes a network 124 and a server 126. In some embodiments, the actuators such as the roll actuator 106, the tilt actuator 108 and the pan actuator 110 are electric motors, but the actuators are not limited to the electric motors. In some embodiments, the actuators such as the roll actuator 106, the tilt actuator 108 and the pan actuator 110 are solenoids, but the actuators are not limited to the solenoids. In some embodiments, the actuators such as the roll actuator 106, the tilt actuator 108 and the pan actuator 110 are pneumatic actuators, but the actuators are not limited to the pneumatic actuators. In some embodiments, the actuators such as the roll actuator 106, the tilt actuator 108 and the pan actuator 110 are hydraulic cylinders, but the actuators are not limited to the hydraulic cylinders. In some embodiments, the actuators such as the roll actuator 106, the tilt actuator 108 and the pan actuator 110 are comb drives, but the actuators are not limited to the comb drives. The one or more sensors 104A-D mounted on the motorized platform 105 collect sensor data about at least one of the subject and an environment. The one or more sensors 104A-D detect at least one of (i) movement, (ii) positions, (iii) gestures, (iv) poses, (v) actions, (vi) sounds and (vii) facial expressions of the subject, and the environment that includes a background, e.g., color, scenery, obstacles, lighting, etc., around the subject. The subject may include one or more persons, pets, props, etc.

The one or more sensors 104A-D may include subject sensors that detect the subject and environment sensors that detect the environment surrounding the subject. In some embodiments, the one or more sensors 104A-D are video cameras or Red Green Blue (RGB) cameras, but the one or more sensors 104A-D are not limited to the video cameras or the Red Green Blue (RGB) cameras. In some embodiments, the one or more sensors 104A-D are depth and stereo cameras such as structured light, Time-of-Flight or RGB stereo pairs, but the one or more sensors 104A-D are not limited to the depth and stereo cameras. In some embodiments, the one or more sensors 104A-D are far infrared (heat) sensors, but the one or more sensors 104A-D are not limited to the far infrared (heat) sensors. In some embodiments, the one or more sensors 104A-D are infrared and ultrasound proximity sensors, but the one or more sensors 104A-D are not limited to the infrared and ultrasound proximity sensors. In some embodiments, the one or more sensors 104A-D are weight and pressure sensors, but the one or more sensors 104A-D are not limited to the weight and pressure sensors. In some embodiments, the one or more sensors 104A-D are sound sensors, but the one or more sensors 104A-D are not limited to the sound sensors. In some embodiments, the one or more sensors 104A-D are motion sensors, but the one or more sensors 104A-D are not limited to the motion sensors. In some embodiments, the one or more sensors 104A-D are Global Positioning System (GPS) and other global or local positioning solutions, but the one or more sensors 104A-D are not limited to the Global Positioning System (GPS) and other global or local positioning solutions. In some embodiments, the one or more sensors 104A-D are light sensors, but the one or more sensors 104A-D are not limited to the light sensors. In some embodiments, the one or more sensors 104A-D are magnetic sensors, but the one or more sensors 104A-D are not limited to the magnetic sensors. In some embodiments, the one or more sensors 104A-D are gyroscopes, but the one or more sensors 104A-D are not limited to the gyroscopes.

The control unit 116 may include a microcontroller or a microprocessor, a memory, digital input ports to receive sensor data from the one or more sensors 104A-D, and digital output ports for generating control commands that control the actuators such as the roll actuator 106, the tilt actuator 108, the pan actuator 110 etc. light sources, sound sources, and the display unit 112. In some embodiments, the memory of the control unit 116 stores and executes software instructions to implement algorithms such as processing inputs from the one or more sensors 104A-D, detecting a position of the subject, modifying the displayed environment, controlling hardware components etc. In some embodiments, the control unit 116 detects a gesture, e.g., movement of hands, face, or other parts of the body such as raising the hands, tapping or drumming fingers, tilting head, etc. from the subject using the one or more sensors 104A-D. In some embodiments, the control unit 116 generates the control commands to (i) control a lighting around the subject or (ii) zoom the camera 102 based at least in part on the sensor data from the one or more sensors 104A-D.

In response to the gesture from the subject detected by the control unit 116, the control unit 116 instructs the actuators to move the camera 102 along or around at least one degree of freedom that is selected from at least one of (i) rotating the camera 102 around horizontal axis, (ii) rotating the camera 102 around vertical axis, (iii) moving the camera 102 parallel to the vertical axis, and (iv) moving the camera 102 parallel to the horizontal axis based on the control commands.

In some embodiments, the control unit 116 controls movement of the camera 102 and a payload, including at least the camera 102 and at least one sensor of the one or more sensors 104A-D, in a "portrait-landscape" axis using the roll actuator 106 based on a subject's height. In some embodiments, the landscape axis refers to an orientation where a live image of the subject is in a horizontal display. In some embodiments, the portrait axis refers to an orientation where the live image of the subject is in a vertical display. In some embodiments, the control unit 116 controls the movement of the camera 102 and the payload in a horizontal axis e.g., 10 degrees to left or 10 degrees to right using the pan actuator 110 when the subject moves to the right or the left based at least in part on the sensor data from the one or more sensors 104A-D. In some embodiments, the control unit 116 controls the movement of the camera 102 and the payload in a vertical axis using the tilt actuator 108 to maintain the focus on the subject's face at a predetermined distance, e.g., the subject's face is positioned about one-third of way down from top of a frame. In some embodiments, a screen of the display unit 112 is 6 feet in height, the control unit 116 maintains the focus on the subject's face at 2 feet from the top of the frame. In some embodiments, a screen of the display unit 112 is 5 feet in height, the control unit 116 maintains the focus on the subject's face at 1.5 feet from the top of the frame. In some embodiments, the elevation actuator 120 controls the payload to raise or lower the payload along the vertical axis based at least in part on the sensor data from the one or more sensors 104A-D.

The camera 102 captures the live image for each position of the subject, e.g., a user using the camera 102 and communicates the live image to the control unit 116. In some embodiments, the live image is a raw feed which is captured by the camera 102. In some embodiments, the camera 102 is dedicated digital camera, such as a digital single-lens reflex (DSLR), a compact point and shoot camera, a web camera, a tablet and phone camera, but the camera 102 is not limited to the dedicated digital camera. In some embodiments, the camera 102 is a dedicated Red, Green and Blue (RGB) sensor, but the camera 102 is not limited to the dedicated Red, Green and Blue (RGB) sensor. The control unit 116 continuously obtains the live image of the subject from the camera 102 and displays the live image for each position of the subject using the display unit 112 based on a region of focus of the camera 102. The camera 102 may capture still images and/or motion images, such as movie files or animated GIFs of the subject.

In some embodiments, the control unit 116 detects the position of the subject using the one or more sensors 104A-D, such as a motion sensor. The control unit 116 detects the first position of the subject, e.g., in the center with respect to the camera 102 using the one or more sensors 104A-D. The control unit 116 generates the control commands to actuate the actuators to capture the live image of the subject at the first position using the camera 102. The control unit 116 obtains the live image of the subject at the first position and applies an environment modification rule that is stored in an environment rules engine to modify the live image with a layer that is stored in a content database. The content database is described with regard to FIG. 2. In some other embodiments, the content database is accessed via the server 126. In some embodiments, the layer is at least one of (i) a background layer, e.g., a waterfall in Hawaii and (ii) a foreground layer, e.g., logos of the live image of the subject in the first position. In some embodiments, the environment rules engine includes one or more environment modification rules to modify the live image with the one or more layers that are stored in the content database. In some embodiments, the environment rules engine may modify the live image of the subject with the background layer, e.g., the waterfall in Hawaii based on the gesture of the subject, e.g., a thumbs down gesture from the subject using a first environment modification rule. In some embodiments, the environment rules engine may modify the live image of the subject with the background layer, e.g., a natural scenery based on the position of the subject, e.g., the subject is in left from the center with respect to the camera 102 using a second environment modification rule.

The control unit 116 displays the live image of the subject with the modified live image at the first position using the display unit 112. In some embodiments, the display unit 112 is a Liquid crystal (LCD) display, a Light-emitting diode (LED) display or a Plasma (PDP) display.

In some embodiments, the content database includes one or more background layers, e.g., the waterfall in Hawaii, a jungle, a desert, an arctic scene, etc., and one or more foreground layers, e.g., the logos, product carousels, panoramic views of venues, sports team brands, celebrities, animals, cartoon characters, etc. In some embodiments, the layer is at least one of an image, e.g., a JPG, PNG, etc., animation, e.g., an animated GIF, MOV, etc., or a collection of images or animations that an operator or administrator may design or select.

In one example, the control unit 116 detects the second position of the subject, e.g., the user is to the left of the camera 102 using the one or more sensors 104A-D. The control unit 116 generates the control commands to actuate the actuators to turn the camera 102 to the left. The camera 102 captures the live image of the subject at the second position and communicates the live image to the control unit 116. The control unit 116 obtains the live image of the subject at the second position and applies the environment modification rule that is stored in the environment rules engine to modify the live image with the layer, e.g., the background layer includes a sandy photograph from Sahara desert or the foreground layer includes Microsoft logo® that is stored in the content database.

In some embodiments, the control unit 116 displays the modified live image by removing the environment of the live image of the subject using a Chroma Key screen, e.g., a Green Screen technique to distinguish between foreground pixels and background pixels on an image. In some embodiments, the control unit 116 modifies the environment of the live image of the subject using Artificial Intelligence (AI)-enabled background removal techniques. In some embodiments, the AI enabled background removal techniques remove the environment of the live image by identifying the subject and removing the environment of the live image of the subject without removing an image of the subject, e.g., the user. In some embodiments, background removal can be achieved by at least one of a depth sensor, a stereo camera, a thermal camera, and other sensors.

The control unit 116 modifies the live image based on a selection by the administrator, the operator or the user. The administrator or the operator or user may upload an image with a custom-made environment or select the layer that is stored in the content database. The administrator, operator or user may select the layer from the server 126. In some embodiments, the control unit 116 communicates with the server 126 through the network 124. In some embodiments, the network 124 is a wired network. In some embodiments, the network 124 is a wireless network. In some embodiments, the network 124 is a combination of a wired network and a wireless network. In some embodiments, the network 124 is the Internet. The server 126 may communicate the layer to the control unit 116 based on the selection of the operator or the user.

In some embodiments, the control unit 116 obtains a live video of the subject using the camera 102. In some embodiments, the control unit 116 obtains an audio input from the subject, e.g., the user, and records the audio using the microphone 118. The control unit 116 may generate a multimedia audiovisual output, such as a video or a movie based on an instruction received via the audio from the microphone and the live video of the subject. The control unit 116 may display the generated multimedia audiovisual output using the display unit 112.

The stand 122 provides a platform for mounting components such as the camera 102, the one or more sensors 104A-D, the actuators, the display unit 112, the fixed position sensor 114, the control unit 116, the microphone 118 and the elevation actuator 120. In some embodiments, a power source, e.g., a battery such as a rechargeable lead-acid or lithium-ion, is mounted on the stand 122 to provide power to electrical components such as the camera 102, the control unit 116, and lights.

Figure 1C:
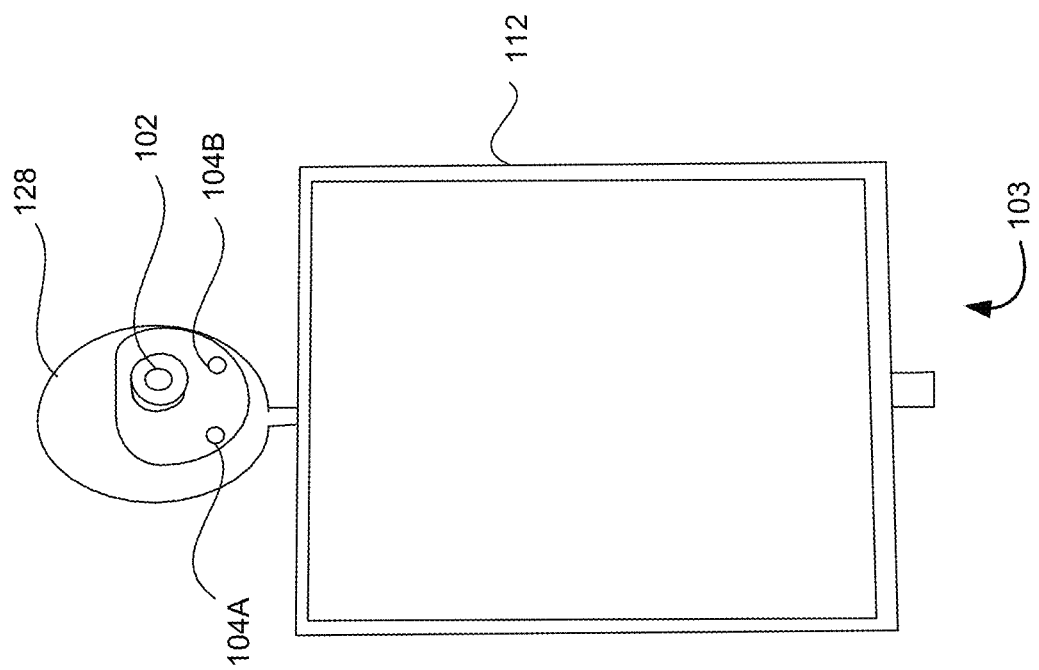
FIGS. 1B and 1C are exemplary perspective views of the automated interactive system with a shell and a display unit according to some embodiments herein.
Figure 1B:
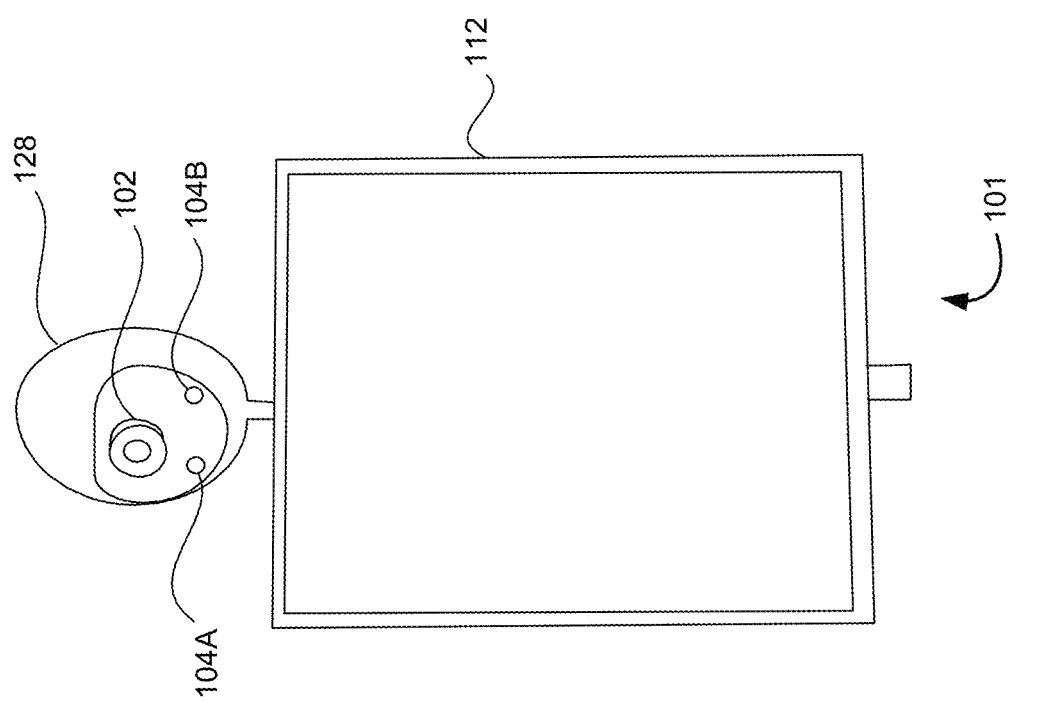

FIGS. 1B and 1C are exemplary perspective views of the automated interactive system with a shell 128 and the display unit 112 according to some embodiments herein. In FIG. 1B of an exemplary perspective view 101 that includes the camera 102 and sensors 104A,B that are mounted on the shell 128. In some embodiments, the camera 102 and the sensors 104A,B are mounted on the shell 128 that is controlled using the actuators such as (i) the roll actuator 106, (ii) the tilt actuator 108 or (iii) the pan actuator 110 as shown in FIG. 1A. In some embodiments, the sensors 104A,B are gesture sensors, but the sensors 104A,B are not limited to the gesture sensors. In some embodiments, the sensors 104A,B are encoders or gravity sensors that detects a position of the shell 128. Alternatively, the position of the shell 128 may be detected using logical sensors using software based on the control commands generated by the control unit 116. In some embodiments, the control unit 116 determines modalities of operation of the camera 102 based on at least one of (i) the position of the shell 128 and (ii) the position of a subject. In some embodiments, the modalities of operation includes capturing at least one of (i) a still photo and (ii) a video of the subject. In some embodiments, the camera 102 captures the still photo of the subject based on a first position of the shell 128 relative to a center of the shell 128 (as shown in FIG. 1B). For example, when the shell 128 is positioned to the right of its center (as shown in FIG. 1C), the camera 102 may shoot still photos.

In FIG. 1C of an exemplary perspective view 103, the camera 102 captures the live video of the subject based on a second position of the shell 128 relative to the center of the shell 128 (as shown in FIG. 1C). In some embodiments, when the shell 128 is positioned to the right of its center, the camera 102 may shoot videos. Indications may be provided through visual or auditory cues such as physical signs or audio messages to indicate the modality of operation e.g., the still photo or the video of the camera 102 depending on its position e.g., left or right.

Figure 2:
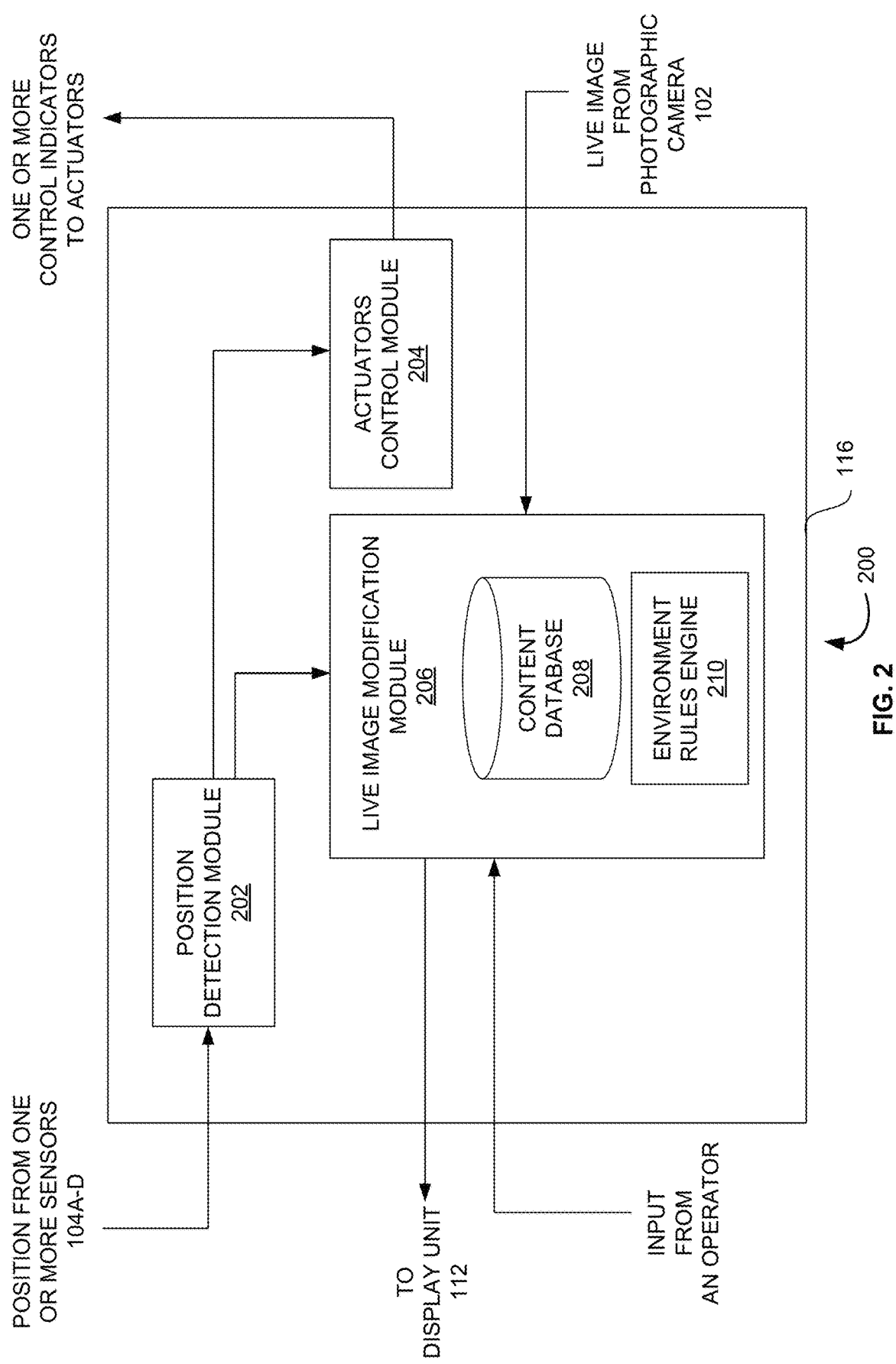
FIG. 2 is a block diagram of a control unit of the automated interactive system of FIG. 1 according to some embodiments herein.

FIG. 2 is a block diagram 200 of the control unit 116 of the automated interactive system 100 of FIG. 1 according to some embodiments herein. The control unit 116 includes a position detection module 202, an actuators control module 204, and a live image modification module 206. The environment modification module 206 includes a content database 208 and an environment rules engine 210. The position detection module 202 detects a position of a subject, e.g., a user using at least one sensor 104A-D as shown in FIG. 1A. The actuators control module 204 generates control commands to control a position of the camera 102 using at least one of (i) the roll actuator 106, (ii) the tilt actuator 108 or (iii) the pan actuator 110. In some embodiments, the environment is refreshed, and changes periodically based on array of images stored in stored in the content database 208.

The live image modification module 206 continuously obtains a live image of the subject from the camera 102 and displays the live image of the subject using the display unit 112. The live image modification module 206 obtains the position of the subject from the position detection module 202 and applies at least one environment modification rule that is performed by the environment rules engine 210 to modify the live image in a frame with a layer based on the position of the subject. In some embodiments, the layer is stored in the content database 208. In some embodiments, the layer is at least one of (i) a background layer and (ii) a foreground layer. The live image modification module 206 may include a mapping function that translates a position of the camera 102 to an image coordinate.

In some embodiments, the live image modification module 206 modifies the live image of the subject, e.g., the user based on selection of an operator. The live image modification module 206 communicates the modified live image of the subject to the display unit 112. The display unit 112 displays the modified live image of the subject.

For example, if the subject is more than 10 degrees to the left of the camera 102, the actuators control module 204 may turn the camera 102 10 degrees or more to its left so that the subject remains at a focus of the frame e.g., centered, and the live image modification module 206 may display an image with a background of a jungle. If the subject is in a center region, e.g., between −10 to +10 degrees to the camera 102, the actuators control module 204 may orient the camera 102 to face the center and the live image modification module 206 may display an image with a background of a desert. If the subject is more than 10 degrees to the right of the camera 102, the actuators control module 204 may turn the camera 102 10 degrees or more to its right in order to maintain the focus on the subject e.g., at a center of the frame and the live image modification module 206 may display an image with a background of an arctic scene. In some embodiments, as the subject moves between 10 to +10 degrees to the camera 102, the background and the foreground layer gradually slides continuously in different directions to show different views at different angles of a desert scene and one or more logos. However, when the angle exceeds 10 degrees to the right of the camera 102, the background changes abruptly to the arctic scene. Likewise, the angle exceeds 10 degrees to the left of the camera 102, the background changes abruptly to the jungle scene.

In some embodiments, the environment rules engine 210 applies a layer to the live image of the subject in the at least one position. In some embodiments, if the subject, e.g., the user captures the live image with the environment includes the background, e.g., the desert, the environment rules engine 210 identifies the subject, e.g., the user in the live image and determines pixels that correspond to the subject, e.g., the user and pixels that correspond to the environment includes the background, e.g., the desert in the live image of the subject. The environment rules engine 210 removes or replaces the pixels that correspond to the environment without removing the pixels that correspond to the subject, e.g., the user using at least one Artificial Intelligence (AI) enabled background removal technique or a Chroma Keying background replacement technique. The environment rules engine 210 applies the layer on the live image of the subject. In some embodiments, the environment rules engine 210 applies the layer on top of pixels that corresponds to at least one of (i) a background and (ii) a foreground of the live image of the subject.

In some embodiments, the background layer and the foreground layer may be changed gradually as the actuators control module 204 follows the subject. For example, if the content database 208 includes the background layer of a panoramic image of a city's skyline and the foreground layer of a panoramic view of a venue, as the subject moves to the right of the camera 102, the actuators control module 204 gradually moves the camera 102 to the right to follow the subject, while the live image modification module 206 gradually shifts a portion of the visible city skyline and the panoramic view of the venue to the right so that the subject, e.g., the user appears to be gradually scrolling the background layer and the foreground layer. In some embodiments, the Chroma Key screen may cover walls floors, ceilings etc. so that as the subject moves, the background is modified throughout the entire range of motion that the actuators control module 204 is capable of.

In some embodiments, the live image modification module 206 determines a speed of scrolling of the layer of the subject, e.g., the user as the subject moves across a scene based on dimensions of a background image or a number of background images. For example, if the background image is 20,000 pixels by 10,000 pixels, and a range of motion of the camera 102 is 50 degrees left to right, then the live image modification module 206 may slide the layer horizontally by 400 pixels (20,000/50=400) for each horizontal degree of the motion of the camera 102.

In some embodiments, the environment rules engine 210 slides the layer continuously based on movement of the subject. The environment rules engine 210 may include a rule that modifies a zoom level of the layer based on a distance between the subject and the camera 102. In some embodiments, the environment rules engine 210 includes a rule that hides or dynamically displays the layer on the live image of the subject based at least in part on the sensor data includes the subject's movement detected by the one or more sensors 104A-D.

In some embodiments, the environment rules engine 210 applies one or more layers and continuously slides each layer on the live image of the subject. In some embodiments, the environment rules engine 210 continuously slides a specific layer and maintains other layers stationary on the live image of the subject.

Figure 3A:
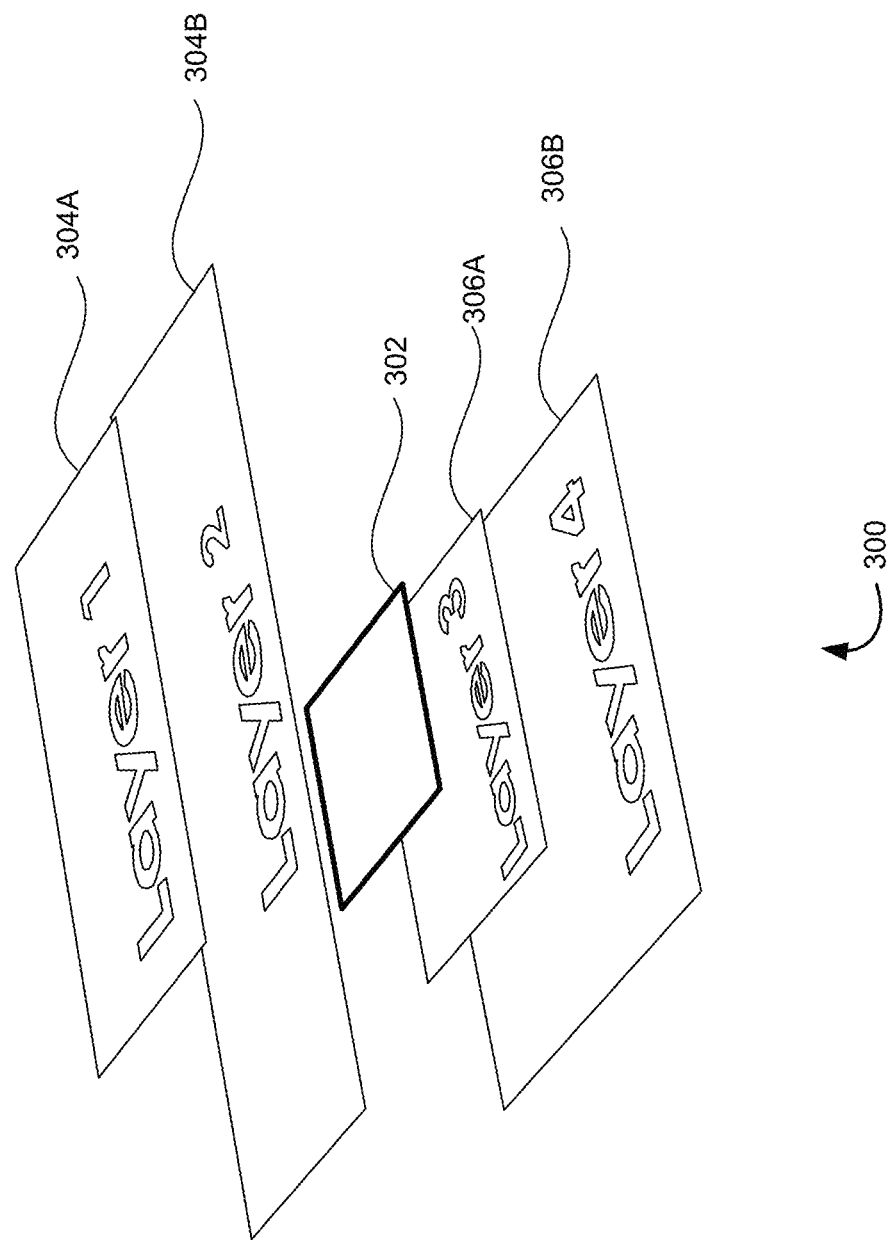
FIG. 3A is an exemplary perspective view of a live image that includes foreground layers and background layers according to some embodiments herein.

FIG. 3A is an exemplary perspective view 300 of a live image that includes foreground layers 304A-B and background layers 306A-B according to some embodiments herein. The exemplary planar view 300 includes a live view layer 302, the foreground layers 304A-B and the background layers 306A-B. In some embodiments, the live view layer 302 is at least one of (i) a real time video stream and (ii) a photo or video captured by the camera 102. In some embodiments, the foreground layers 304A-B and the background layers 306A-B are selected from at least one of an image, an animated image, a video and an Animated Portable Network Graphics (APNG) file. In some embodiments, the control unit 116, as shown in FIG. 1A, may generates an animation in the live image of the subject by applying the animation on top or below the live view layer 302. In some embodiments, the control unit 116 displays the live image with the animation on the display unit 112, or captures and converts the live image with the animation into a file and shares with a user device associated with a user through the network 124, as shown in FIG. 1A. The control unit 116 may generate a still image, e.g., JPG by extracting the animation from the live image. In some embodiments, the still image may include a superposition of the foreground layers 304A-B and the background layers 306A-B including a single frame from an animated layer of the live image displayed in the live view layer 302.

In some embodiments, the foreground layers 304A-B and the background layers 306A-B may include transparent regions. In some embodiments, the foreground layers 304A-B and the background layers 306A-B may not include the transparent regions. In some embodiments, a non-transparent pixel on a topmost layer, e.g., a foreground layer 304A includes same cartesian coordinates pixels of lower level layers, e.g., a background layer 306B. For example, the pixel with coordinates 100×100 on the foreground layer 304A over pixels having the same coordinate on the lower level layers.

In some embodiments, the environment rules engine 210 applies a priority rule to determine pixels placed on top of the live view layer 302. In some embodiments, the live view layer 302 is entirely non-transparent (opaque) if the environment rules engine 210 does not include a green screen-based background removal, or any other similar technique e.g., Depth Sensors, AI-based background removal technique. In some embodiments, if the pixel on the topmost layer, e.g., the foreground layer 304A is transparent, final color value for that pixel on the final composition is decided by the color values of corresponding pixels from the next layer, e.g., a foreground layer 304B, and so forth.

In some embodiments, pixels on the foreground layers 304A-B and the background layers 306A-B include transparency of any value, e.g., half-transparent. In some embodiments, the foreground layers 304A-B and the background layers 306A-B have arbitrary, specifiable pixel dimension. The foreground layers 304A-B and the background layers 306A-B are projected on top of each other to generate an image with pre-determined pixel dimensions. In some embodiments, an operator or administrator or a user may select the pixel dimensions for the live image.

In some embodiments, the foreground layers 304A-B and the background layers 306A-B may be hidden or shown dynamically by the control unit 116 based on sensor data from the one or more sensors 104A-D. The control unit 116 may hide some layers and show other layers based on a position of a subject, e.g., a user on a scene. For example, at a stadium, if the subject, e.g., the user moves to left from center of a frame, the control unit 116 displays one sports team logo. If the subject, e.g., the user moves to right from the center of the frame, the control unit 116 displays a another sports team logo.

The control unit 116 may change positions or the priority order of the foreground layers 304A-B and the background layers 306A-B in the layer stack based at least in part on the sensor data. For example, when the subject, e.g., the user moves close to the camera 102, the control unit 116 may change a certain foreground layer, e.g., the foreground layer 304A as a background layer and display the background layer behind the subject, e.g., the user.

Figure 3B:
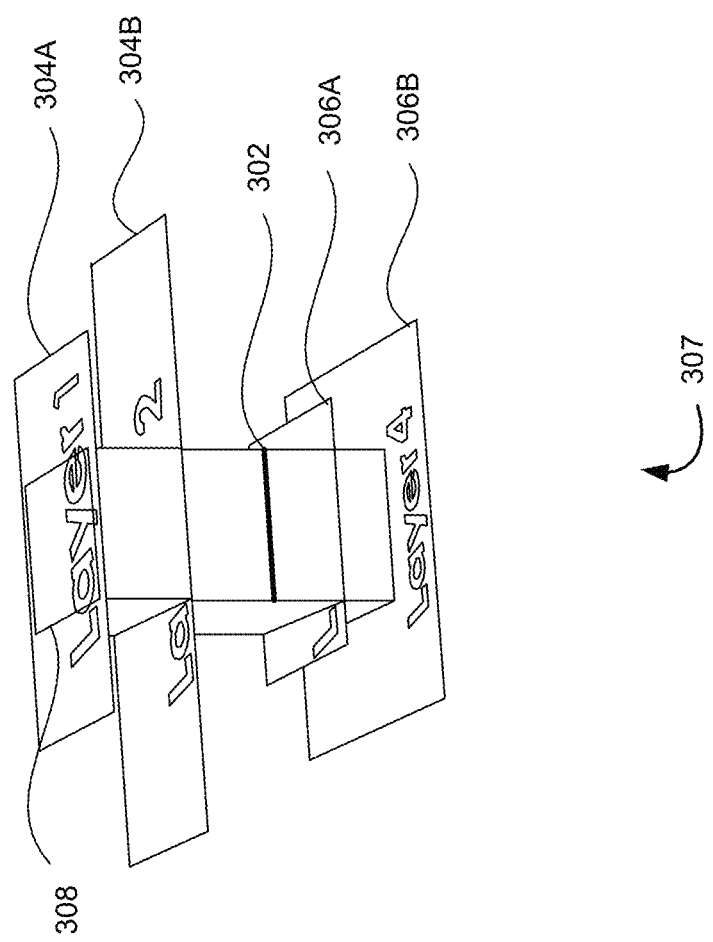
FIG. 3B is an exemplary perspective view of modifying the live image of a subject with the foreground layers and the background layers of FIG. 3A that are mapped centrally with different dimensions according to some embodiments herein.

FIG. 3B is an exemplary perspective view 307 of modifying a live image of a subject with the foreground layers 304A-B and the background layers 306A-B of FIG. 3A that are mapped centrally with different dimensions according to some embodiments herein. The exemplary planar view 307 includes the live view layer 302, the foreground layers 304A-B, the background layers 306A-B and a slicing window 308. In some embodiments, the control unit 116, as shown in FIG. 1A, implements the slicing window 308 at center of each foreground layers 304A-B and each background layers 306A-B and the live view layer 302 (as shown in FIG. 3B) to obtain a modified live image of a subject using central portions of the foreground layers 304A-B and the background layers 306A-B. In some embodiments, the slicing window 308 goes through each layer, and stacks portions of each layer that fall within that column on top of each other in top-down priority order to generate the modified live image of the subject, e.g., a user.

Figure 3C:
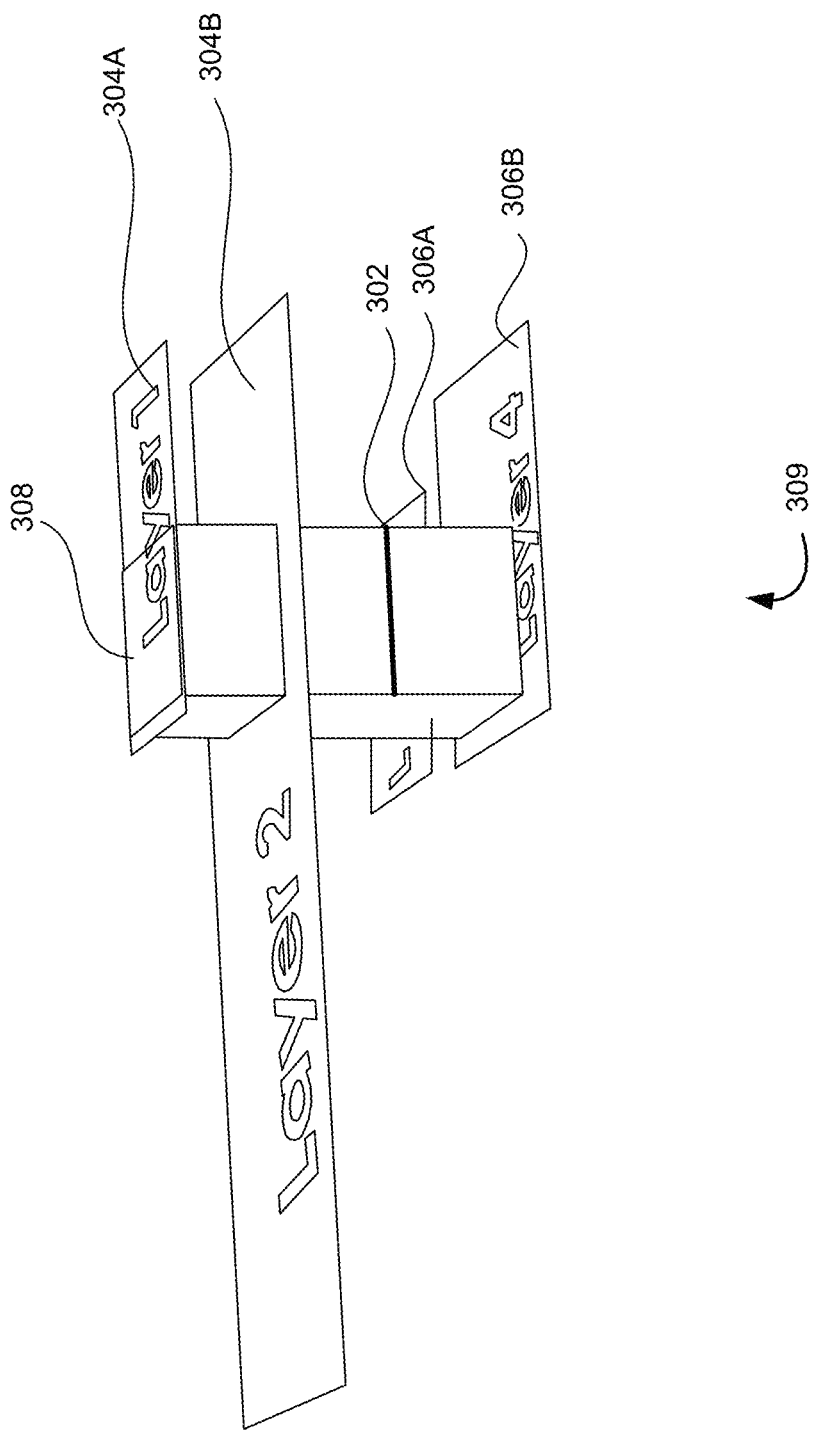
FIG. 3C is an exemplary perspective view of modifying the live image of the subject with the foreground layers and the background layers of FIG. 3A that are mapped non-centrally according to some embodiments herein.

FIG. 3C is an exemplary perspective view 309 of modifying a live image of a subject and the live view layer 302 with the foreground layers 304A-B and the background layers 306A-B of FIG. 3A that are mapped non-centrally according to some embodiments herein. The exemplary planar view 309 includes the live view layer 302, the foreground layers 304A-B, the background layers 306A-B and the slicing window 308. The control unit 116, as shown in FIG. 1A, may generate a modified live image of fixed size from the foreground layers 304A-B and the background layers 306A-B that are mapped non-centrally. In some embodiments, the background layer 306A is moved up the modified live image (as shown in FIG. 3C). In some embodiments, the foreground layers 304A-B and the background layers 306A-B are projected on top of each other to generate the modified live image with pre-determined pixel dimensions. In some embodiments, an operator or an administrator or a user may select the pixel dimensions for the modified live image. For example, the administrator or the user may specify dimension of the modified live image, e.g., 1000×1500 pixels along x and y coordinates respectively. The modified live image may be stacked with 1000×1500 portions of the foreground layers 304A-B and the background layers 306A-B, according to their current position and a priority order.

Figure 3D:
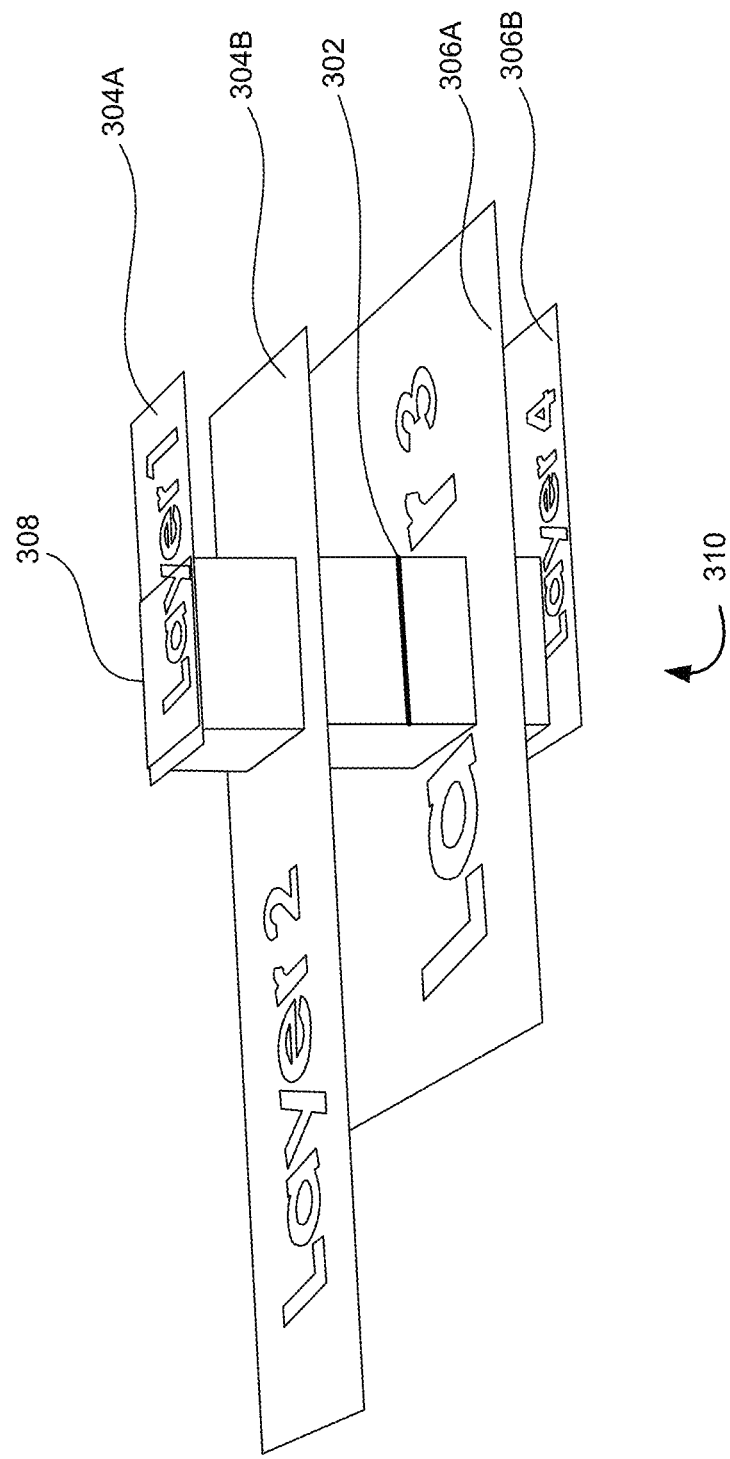
FIG. 3D is an exemplary perspective view of modifying the live image of the subject with the foreground layers and the background layers of FIG. 3A that are mapped non-centrally and zoomed in and zoomed out positions according to some embodiments herein.

FIG. 3D is an exemplary perspective view 310 of modifying the live image of the subject with the foreground layers 304A-B and the background layers 306A-B of FIG. 3A that are mapped non-centrally and zoomed in and zoomed out positions according to some embodiments herein. The exemplary planar view 310 includes the live view layer 302, the foreground layers 304A-B, the background layers 306A-B and the slicing window 308. The control unit 116, as shown in FIG. 1A, generates a modified live image with the foreground layers 304A-B and the background layers 306A-B that are mapped non-centrally and zoomed in/out based on a mapping function of each foreground layer 304A-B and each background layer 306-B. For example, the foreground layer 304A is in a zoomed-out position and the foreground layer 304B and the background layer 306B are in zoomed in positions (as shown in FIG. 3D). In some embodiments, contents in the foreground layer 304A may be smaller on the modified live image and a bigger portion of the foreground layer 304A may become visible. In some embodiments, contents in the foreground layer 304B and the background layer 306B may be enlarged and a small portion of the foreground layer 304B and the background layer 306B may end up on the modified live image. In some embodiments, the control unit 116 generates the modified live image with the foreground layers 304A-B and the background layers 306A-B that are mapped non-centrally and zoomed in/out positions based on a movement of the subject, e.g., a user. For example, if the subject, e.g., the user is near to the camera 102, the control unit 116 may display the foreground layer 304A in the zoomed in position.

Figure 3F:
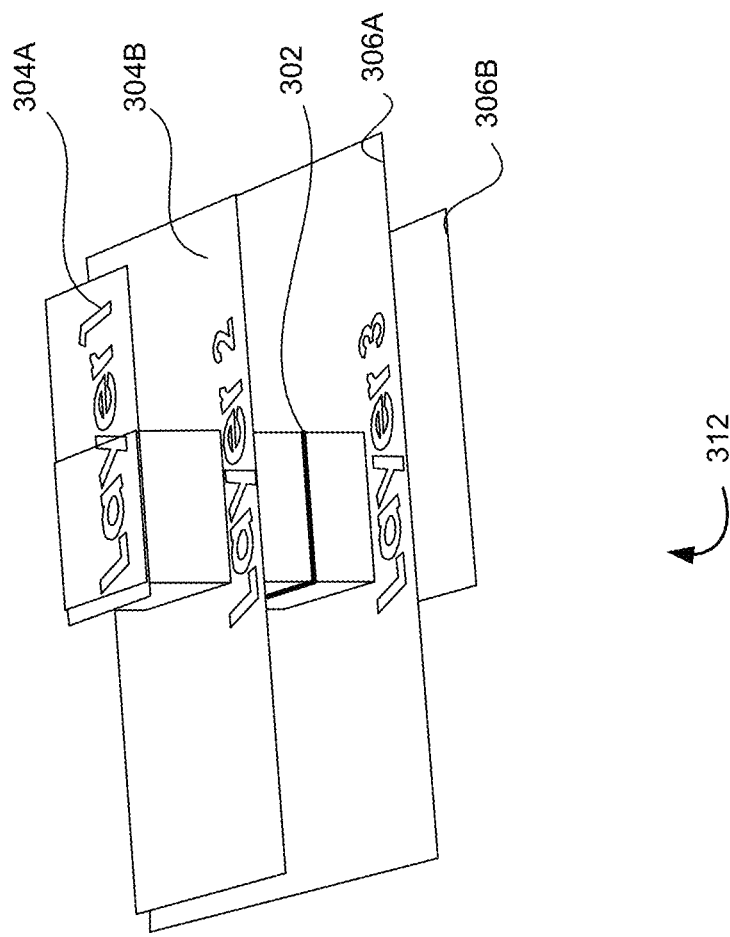
FIG. 3F is an exemplary perspective view of modifying the live image of the subject with the foreground layers and the background layers of FIG. 3A that are stacked on top of each other according to some embodiments herein.
Figure 3E:
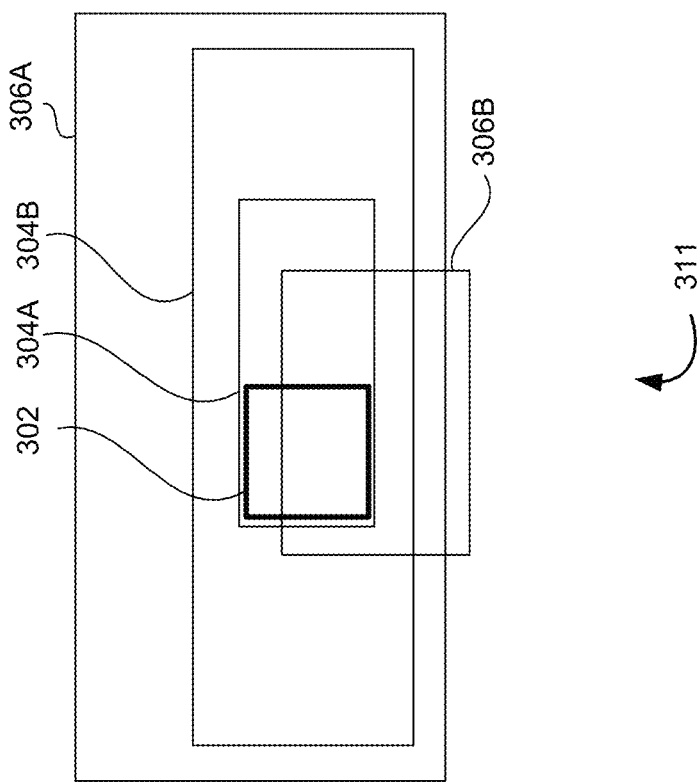
FIG. 3E is an exemplary planar top view of modifying the live image of the subject with the foreground layers and the background layers of FIG. 3A that are stacked on top of each other according to some embodiments herein.

FIG. 3E is an exemplary planar top view of modifying the live image of the subject with the foreground layers 304A-B and the background layers 306A-B of FIG. 3A that are stacked on top of each other according to some embodiments herein. In FIG. 3E, an exemplary planar view 311 that depicts a top view of the foreground layers 304A-B and the background layers 306A-B are stacked on top of each other. The exemplary view 311 assumes a final image dimension to be the same size as the live view 302, which represents a portion which may be included in the modified live image. In some embodiments, the modified live image may be in any dimension. In some embodiments, dimensions of the modified live image selected from (i) same size as the live view layer 302, (ii) larger than the live view layer 302 and (iii) smaller than the live view layer 302.

FIG. 3F is an exemplary perspective view 312 of modifying the live image of the subject with the foreground layers 304A-B and the background layers 306A-B of FIG. 3A that are stacked on top of each other according to some embodiments herein. In FIG. 3F, the exemplary perspective view 312 depicts a bottom view of the foreground layers 304A-B and the background layers 306A-B that are stacked on top of each other.

Figure 3H:
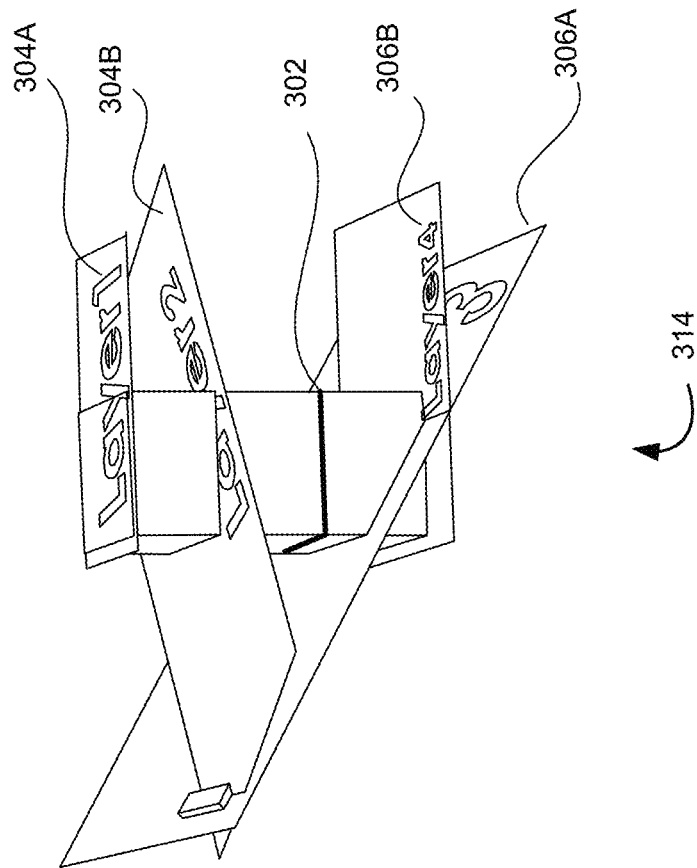
FIG. 3H is an isometric view that illustrates rotation of the foreground layers and the background layers of FIG. 3A according to some embodiments herein.
Figure 3G:
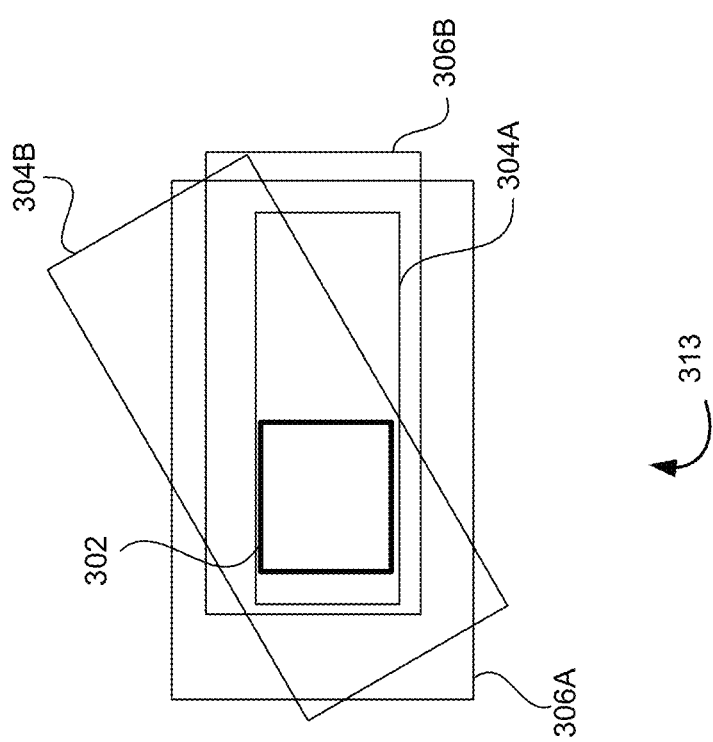
FIG. 3G is an exemplary planar top view of modifying the live image of the subject with the foreground layers and the background layers of FIG. 3A that are rotated according to some embodiments herein.

FIG. 3G is an exemplary planar top view 313 of modifying the live image of the subject the foreground layers 304A-B and the background layers 306A-B of FIG. 3A that are rotated according to some embodiments herein. The exemplary planar view 313 depicts that the foreground layer 304B is rotated around vertical axis, i.e. perpendicular to an image plane. In some embodiments, the background layer 306A is rotated around horizontal axis.

FIG. 3H is an isometric view 314 that illustrates rotation of the foreground layers 304A-B and the background layers 306A-B of FIG. 3A according to some embodiments herein. The isometric view 314 depicts the rotation of the foreground layer 304B and the background layer 306A in at least one direction.

Figure 4:
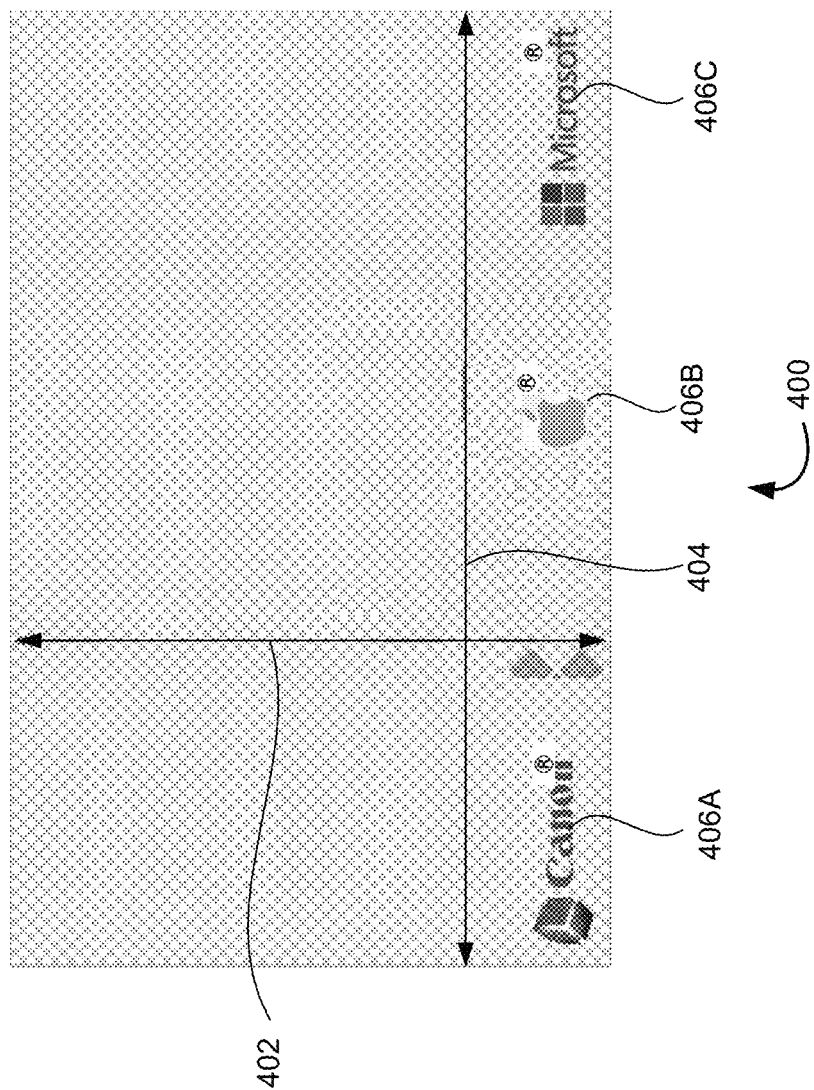
FIG. 4 is a graphical illustration of a screen of a display unit that includes foreground layers according to some embodiments herein.

FIG. 4 is a graphical illustration 400 of a screen of the display unit 112 includes foreground layers 406A-C according to some embodiments herein. In some embodiments, the foreground layers 406A-C, e.g., Canon® Logo 406A, iPhone® Logo 406B and Microsoft® Logo 406C includes a foreground layer mapping function that maps a subject's position, e.g., a user's position to a position of the foreground layers 406A-C on the screen of the display unit 112. For example, the foreground layers 406A-C are two times wider than a screen's width 404, and the control unit 116, as shown in FIG. 1A, maps the width to a range of a subject's motion, e.g., motion of the user. In some embodiments, the screen of the display unit 112 is 1000 pixels wide and the foreground layers 406A-C are 3000 pixels wide, which is three times wider than the screen's width 504. For example, the subject, e.g., the user moves from 0% to 100% left to right from a center of a frame. If the subject, e.g., the user is at 0%, the control unit 116 displays first 1000 columns of the foreground layer's 406A-C width using the screen of the display unit 112. If the subject, e.g., the user is in center to the frame, the control unit 116 crops the foreground layers 406A-C leaving only pixels between 1000 to 2000. If the subject, e.g., the user is at maximum right position from the center of the frame, the control unit 116 display columns 2000-3000 using the screen of the display unit 112.

For example, if the subject, e.g., the user moves to the left from the center of the frame, the control unit 116 displays a first foreground layer, e.g., the Canon® logo 406A. If the subject, e.g., the user in the center of the frame, the control unit 116 displays a second foreground layer, e.g., the iPhone® logo 406B. If the subject, e.g., the user moves to the right from the center of the frame, the control unit 116 displays a third foreground layer, e.g., the Microsoft® logo 406C. In some embodiments, if the subject, e.g., the user is in same position, e.g., sitting down, the control unit 116 may display same foreground layer that is displayed for a previous position of the subject. In some embodiments, if height of the first foreground layer or the second foreground layer is equal to a screen's height 402 of the display unit 112, the control unit 116 may display the same foreground layer that is displayed for the previous position of the subject.

In some embodiments, the foreground layer mapping function maintains the foreground layers 406A-C on the screen of the display unit 112 for a predetermined time, e.g., 10 seconds, 15 seconds, 20 seconds, etc., as specified by the administrator, if the subject, e.g., the user, moves from the center of the frame. In some embodiments, if the subject, e.g., the user crosses a threshold distance, e.g., 2 feet, 3 feet, 4 feet, etc. from the center of the frame, the foreground layer mapping function displays the foreground layers 406A-C on the screen of the display unit 112 by at least one of (i) scrolling the foreground layers 406A-C, and (ii) hiding the first foreground layer by displaying the second foreground layer instead of the first foreground layer.

Figure 5:
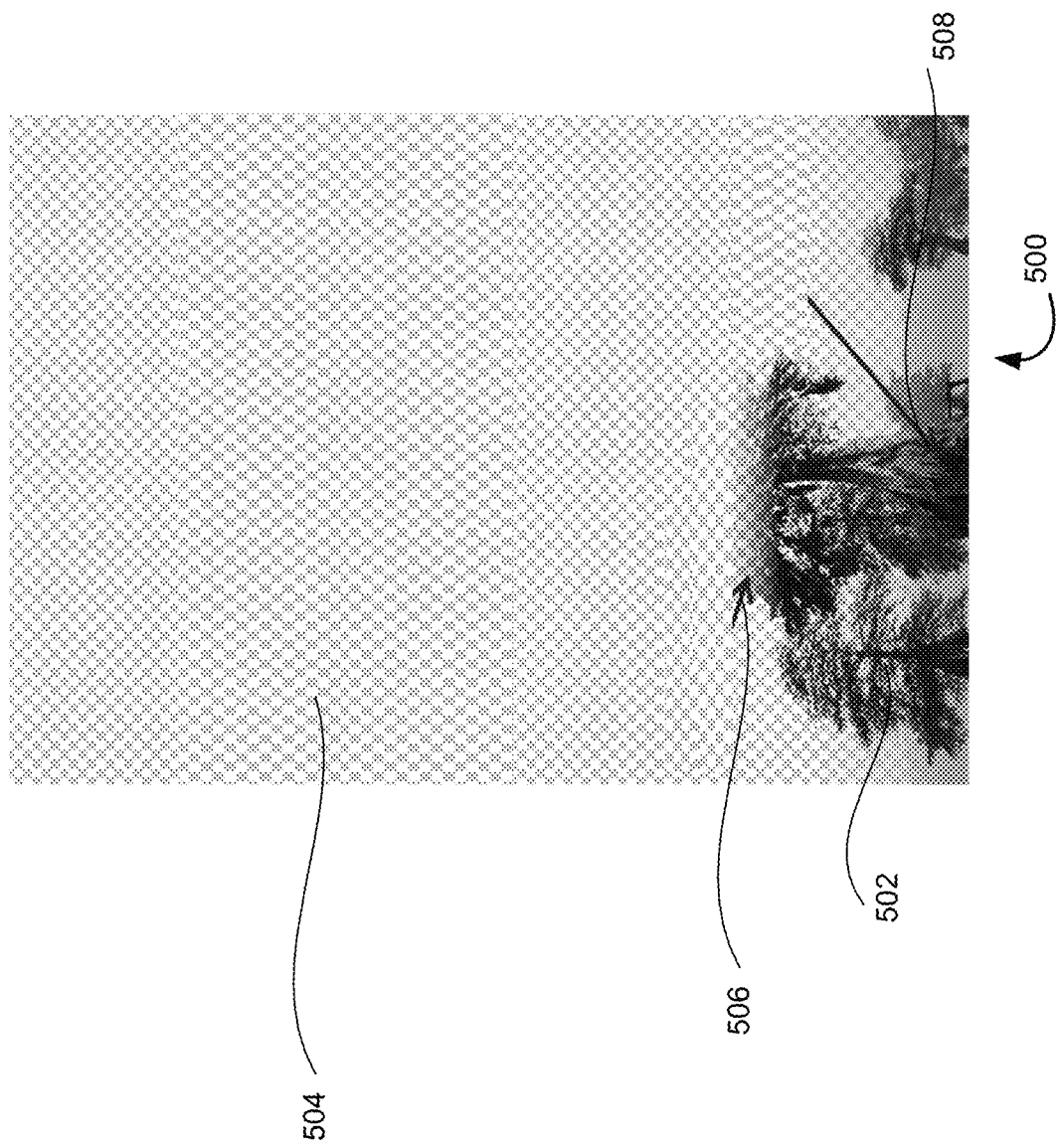
FIG. 5 is an exemplary planar view of the screen of the display unit with a foreground layer that includes transparent area, half-transparent area and non-transparent area according to some embodiments herein.

FIG. 5 is an exemplary planar view 500 of a screen of the display unit 112 with a foreground layer 502 that includes transparent area 504, half-transparent area 506 and non-transparent area 508 according to some embodiments herein. In some embodiments, pixels on the foreground layer 502 includes transparency of any value, e.g., the half-transparent area 506. For example, if the foreground layer 304A includes a pixel that is 60% transparent, a lower level layer may display through and contribute up to 60% of a resulting pixel color value to generate shadow effects, fade-off gradients, etc. The foreground layer 502 includes a mapping function which obtains an input as a layer image, sensor data from the one or more sensors 104A-D and one or more configuration parameters. The mapping function determines which section of the foreground layer 304A to be displayed at the display unit 112. The one or more configuration parameters may be specified for each layer by an operator or a user.

FIG. 6 is an exemplary perspective view 600 of capturing a live image of a subject and dynamically modifying a background of the live image using the automated interactive system 100 of FIG. 1 according to some embodiments herein. The exemplary perspective view 600 includes the camera 102, an actuation unit (not shown in FIG. 6) that includes the roll actuator 106, the tilt actuator 108 and the pan actuator 110, the display unit 112, the subject, e.g., a user 602, a card reader device 604, and a chroma key screen 606. The control unit 116 (as shown in FIG. 1A) detects a position, e.g., a first position of the user 602 using the one or more sensors 104A-D, as shown in FIG. 1A. The camera 102 captures the live image with an environment that includes the chroma key screen 606 as a background. In some embodiments, the chroma key screen 606 is a green screen (as shown in FIG. 6), but not limited to the green screen. of the user 602 for the first position and communicates the live image of the user 602 to the control unit 116. The color of the chroma key screen 606 may be chosen based on a color that does not overlap with human skin colors. In some embodiments, the camera 102 faces the chroma key screen 606 directly perpendicular to an orientation of the chroma key screen 606, and the subject e.g., the user 602 is between the camera 102 and the chroma key screen 606. In some embodiments, the chroma key screen 606 is used to remove background pixels of the live image of the subject e.g., the user 602 and create transparent regions on the live image. In some embodiments, the background pixels are removed by at least one Artificial Intelligence (AI) enabled background removal technique. The control unit 116 applies at least one environment modification rule that is stored in the environment rules engine 210, as shown in FIG. 2, to modify the live image includes the transparent regions with a background layer, e.g., a jungle (as shown in FIG. 6) that is stored in the content database 208. The control unit 116 displays the modified live image of the user 602, e.g., the jungle using the display unit 112. The control unit 116 continuously analyzes the position of the user 602. The control unit 116 processes sensor data from the one or more sensors 104A-D to track the position of the user 602 and controls actuators such as the roll actuator 106, the tilt actuator 108, the pan actuator 110 in the actuation unit to maintain focus on the user 602 approximately in the center of a frame when the environment is modified according to the at least one environment modification rule.

The user 602 may select the environments or parts of the environment based on their interest by physically moving about a scene. The card reader device 604 may activate the control unit 116 based on a card e.g., a magnetic credit card, a debit card, printed QR or bar-code card, QR or barcode displayed by a mobile device, like a mobile phone that is presented by the user 602. In some embodiments, the payment may be determined based on a set of backgrounds chosen by the user 602, a theme, a number of images to be captured, a number of users, a time spent in image capture, etc.

Figure 7B:
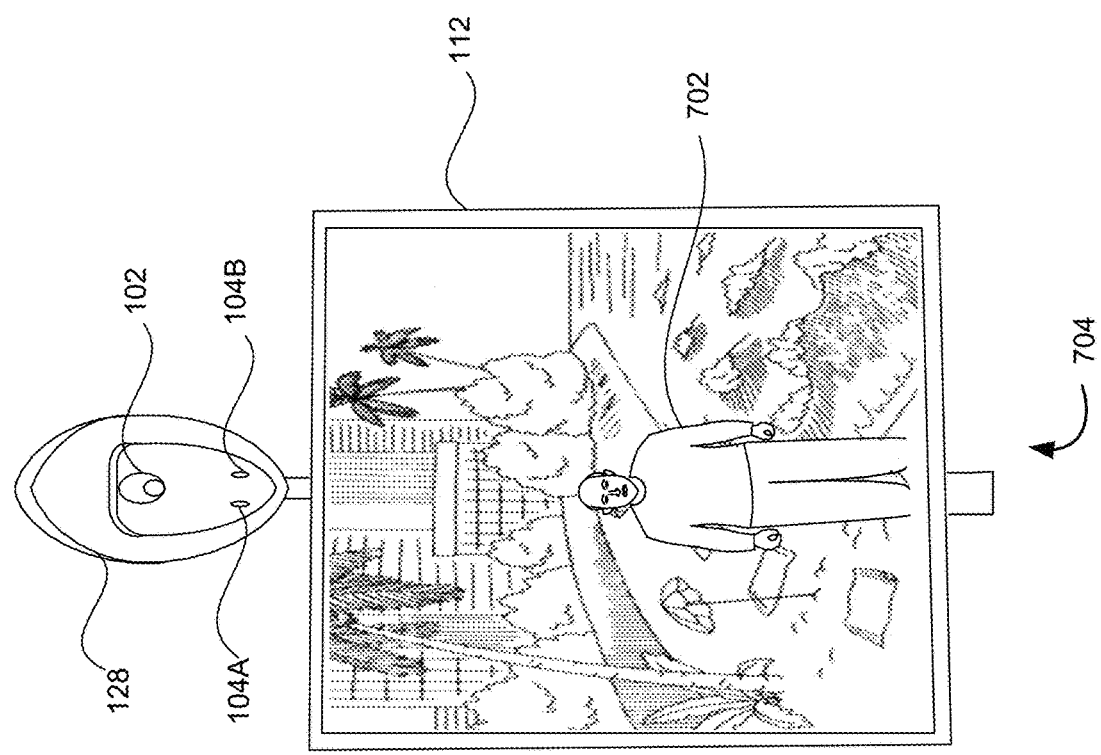

FIGS. 7A-7E illustrate exemplary planar views of capturing live images of a user 702 in different positions and modifying the live images based on the different positions using the automated interactive system 100 of FIG. 1 according to some embodiments herein. In FIG. 7A of an exemplary planar view 700 that includes the camera 102, the display unit 112, the user 702 and the sensors 104A-B. In some embodiments, the camera 102 and the sensors 104A-B are mounted on the shell 128 and controlled using actuators such as (i) the roll actuator 106, (ii) the tilt actuator 108 or (iii) the pan actuator 110. In some embodiments, if the user 702 is in a first position, with respect to the shell 128, e.g., above the center of the shell 128, the shell 128 may turn upwards and capture a live image of the user 702 at the first position, e.g., sitting on the rock. In some embodiments, the at least one actuator turns the shell 128 upwards based on control commands from the control unit 116, as shown in FIG. 1A. In some embodiments, the control unit 116 generates the control commands by detecting a position, e.g., the first position of the user 702 based on a position indicator from the sensors 104A-B. In some embodiments, the control unit 116 detects gestures of the user 702 for the first position using the sensors 104A-B. The control unit 116 applies at least one environment modification rule that is stored in the environment rules engine 210, as shown in FIG. 2, to modify a background of the live image with a background layer, e.g., a city beach scene that is stored in the content database 208, of the user 702 for the first position. The control unit 116 displays the modified live image for the first position of the user 702 using the display unit 112.

In FIG. 7B, an exemplary planar view 704 that includes the camera 102, the display unit 112, the user 702 and the sensors 104A-B. In some embodiments, when the user 702 in the center, e.g., a second position of the shell 128, the shell 128 is in the center and captures a live image of the user 702 at the second position, e.g., the user 702 (as shown in FIG. 7B). The control unit 116, as shown in FIG. 1A, may continuously analyze the position of the user 702 using the sensors 104A-B. In some embodiments, the at least one actuator turns the shell 128 downwards based on the control commands from the control unit 116 to maintain a focus on the user 702 e.g., approximately in the center of a frame when the environment is modified according to the at least one environment modification rule. The control unit 116 applies the at least one environment modification rule that is stored in the environment rules engine 210, as shown in FIG. 2, to modify the background of the live image with a background layer, e.g., the city beach scene that is stored in the content database 208, as shown in FIG. 2, for the second position of the user 702 (as shown in FIG. 7B). In some embodiments, the control unit 116 displays a portion of the jungle scene for the second position of the user 702 using the display unit 112.

In FIG. 7C, an exemplary planar view 706 that includes the camera 102, the display unit 112, the user 702 and the sensors 104A-B. In some embodiments, if the user 702 in center with respect to the shell 128, the shell 128 maintains focus on the user 702 approximately in the center and captures a live image of the user 702 at a third position. In some embodiments, the control unit 116 detects gestures of the user 702 for the third position using the sensors 104A-B. The control unit 116, as shown in FIG. 1A, applies the at least one environment modification rule that is stored in the environment rules engine 210, as shown in FIG. 2 to modify the background of the live image with a background layer, e.g., Eiffel Tower that is stored in the environment content database 208 for the third position. As shown in FIG. 7C, the background layer of the live image may be to the center of the Eiffel Tower. The background layer may slide continuously corresponding to the movement of the user 702. The control unit 116 displays the modified live image for the third position of the user 702 using the display unit 112.

Figure 7D:
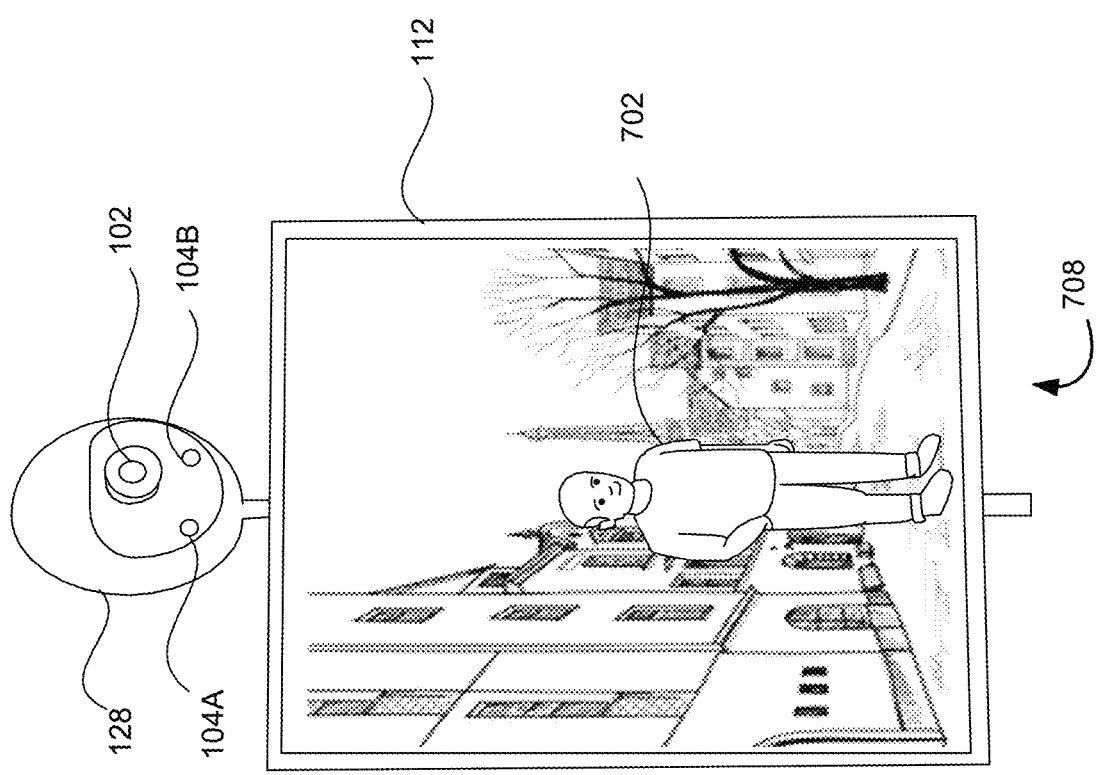

In FIG. 7D, an exemplary planar view 708 that includes the camera 102, the display unit 112, the user 702 and the sensors 104A-B. In some embodiments, if the user 702 moves to the left with respect to the shell 128, the shell 128 moves to maintain focus on the user 702 approximately in the center and captures a live image of the user 702 at a fourth position. In some embodiments, the control unit 116, as shown in FIG. 1A, detects gestures of the user 702 for the fourth position using the sensors 104A-B. The control unit 116 applies the at least one environment modification rule that is stored in the environment rules engine 210, as shown in FIG. 2 to modify the background of the live image with a background layer, e.g., the Eiffel Tower that is stored in the content database 208 for the fourth position. As shown in FIG. 7D, the background layer of the live image may be to the left of the Eiffel Tower. The background layer may slide continuously corresponding to the movement of the user 702. The control unit 116 displays the modified live image for the third position of the user 702 using the display unit 112.

Figure 7E:
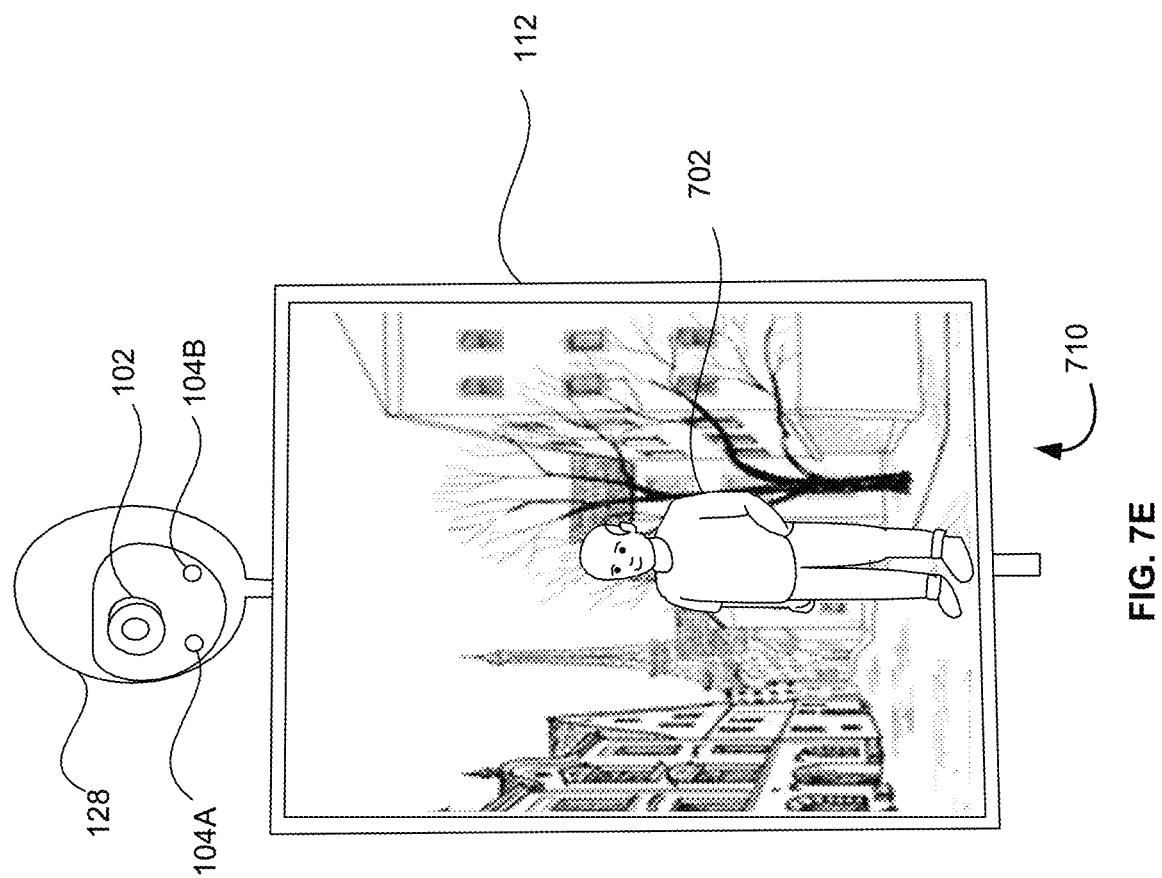

In FIG. 7E, an exemplary planar view 710 that includes the camera 102, the display unit 112, the user 702 and the sensors 104A-B. In some embodiments, if the user 702 moves to the right with respect to the shell 128, the shell 128 moves to maintain focus on the user 702 approximately in the center and captures a live image of the user 702 at a fifth position. The control unit 116, as shown in FIG. 1A, applies the at least one environment modification rule that is stored in the environment rules engine 210, as shown in FIG. 2, to modify the background of the live image with a background layer, e.g., the Eiffel Tower that is stored in the content database 208. As shown in the FIG. 7E, the background layer of the live image shown on the display unit 112 may be to the right of the Eiffel Tower. The background layer may slide continuously corresponding to the movement of the user 702.

In FIG. 7F, an exemplary planar view 712 that includes the camera 102, the display unit 112, the user 702 and the sensors 104A-B. In some embodiments, if the user 702 moves closer to the shell 128, the camera 102 captures the live image of the user 702 in a sixth position e.g., a zoomed in position. The control unit 116, as shown in FIG. 1A, applies the at least one environment modification rule that is stored in the environment rules engine 210, as shown in FIG. 2, to modify a background of the live image with a background layer, e.g., Eiffel Tower for the sixth position. In some embodiments, the environment rules engine 210 includes a rule that modifies a zoom level of the background layer based on a distance between the subject and the camera 102. In some embodiments, the control unit 116 modifies the live image for the sixth position. The control unit 116 displays a modified live image for the sixth position of the user 702 using the display unit 112. In some embodiments, the content database 208 includes one or more background layers, e.g., the Eiffel Tower, an artic scene, a desert, a jungle, etc. In some embodiments, the environment rules engine 210 slides the one or more background layers, e.g., the Eiffel Tower, the artic scene, the desert, the jungle, etc. continuously based on movement of the user 702. In some embodiments, the environment rules engine 210 continuously slides a specific background layer, e.g., the Eiffel Tower and maintains other background layers, e.g., the artic scene, the desert, the jungle, etc. stationary on the live image of the user 702.

Figure 8A:
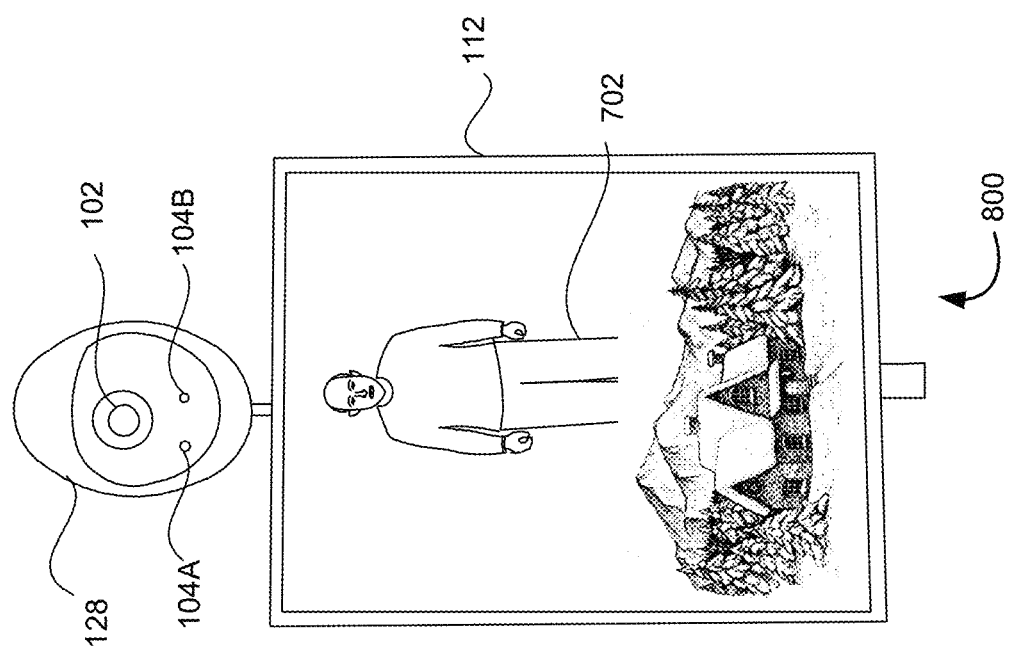
FIGS. 8A-8D illustrate exemplary planar views of capturing live images of a user in different positions and applying an environment modification rule to modify a foreground of the live images based on the different positions using the automated interactive system of FIG. 1 according to some embodiments herein.

FIGS. 8A-8D illustrate exemplary planar views of capturing live images of a user 702 in different positions and applying an environment modification rule to modify a foreground of the live images based on the different positions using the automated interactive system 100 of FIG. 1 according to some embodiments herein. In FIG. 8A of an exemplary planar view 800 that includes the camera 102, the display unit 112, the user 702 and the sensors 104A-B. In some embodiments, the camera 102 and the sensors 104A-B are mounted on the shell 128 and controlled using actuators such as (i) the roll actuator 106, (ii) the tilt actuator 108 or (iii) the pan actuator 110. In some embodiments, if the user 702 is in a first position, e.g., standing in center of a frame (as shown in FIG. 8A) with respect to the shell 128, the camera 102 mounted on the shell 128 may capture a live image of the user 702 at the first position, e.g., standing in center of the frame. In some embodiments, the control unit 116, as shown in FIG. 1A, generates the control commands by detecting a position, e.g., the first position of the user 702 based on a position indicator from the sensors 104A-B. The control unit 116 applies at least one environment modification rule that is stored in the environment rules engine 210 to modify the foreground of the user 702 with a foreground layer, e.g., a natural scenery and home for the first position of the user 702. The control unit 116 displays the modified live image for the first position of the user 702 using the display unit 112.

Figure 8B:
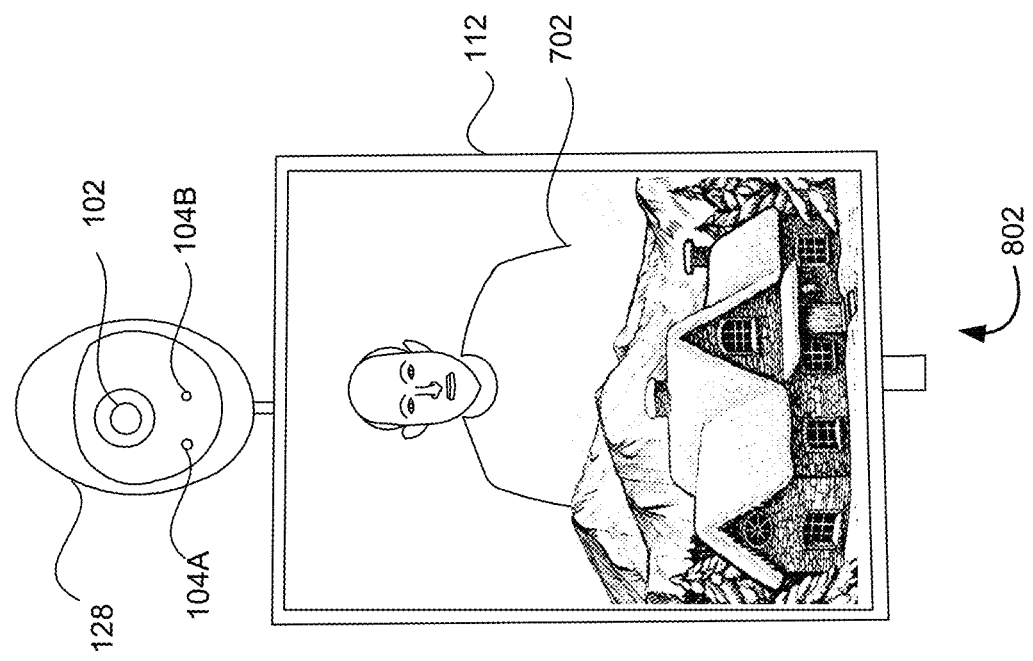

In FIG. 8B, an exemplary planar view 802 that includes the camera 102, the display unit 112, the user 702 and the sensors 104A-B. In some embodiments, if the user 702 moves closer to the shell 128, the camera 102 captures the live image of the user 702 in a second position e.g., a zoomed in position as compared to that shown in FIG. 8A. The control unit 116, as shown in FIG. 1A, applies the at least one environment modification rule that is stored in the environment rules engine 210 to modify the foreground of the live image y with a foreground layer e.g., a natural scenery for the second position. In some embodiments, the environment rules engine 210 includes a rule that modifies a zoom level of the foreground layer based on a distance between the subject, e.g., the user 702 and the camera 102. The control unit 116 displays a modified live image for the second position of the user 702 using the display unit 112. For example, when the subject, e.g., the user 702 moves closer to the camera 102, the control unit 116 displays the same foreground layer appears larger.

Figure 8C:
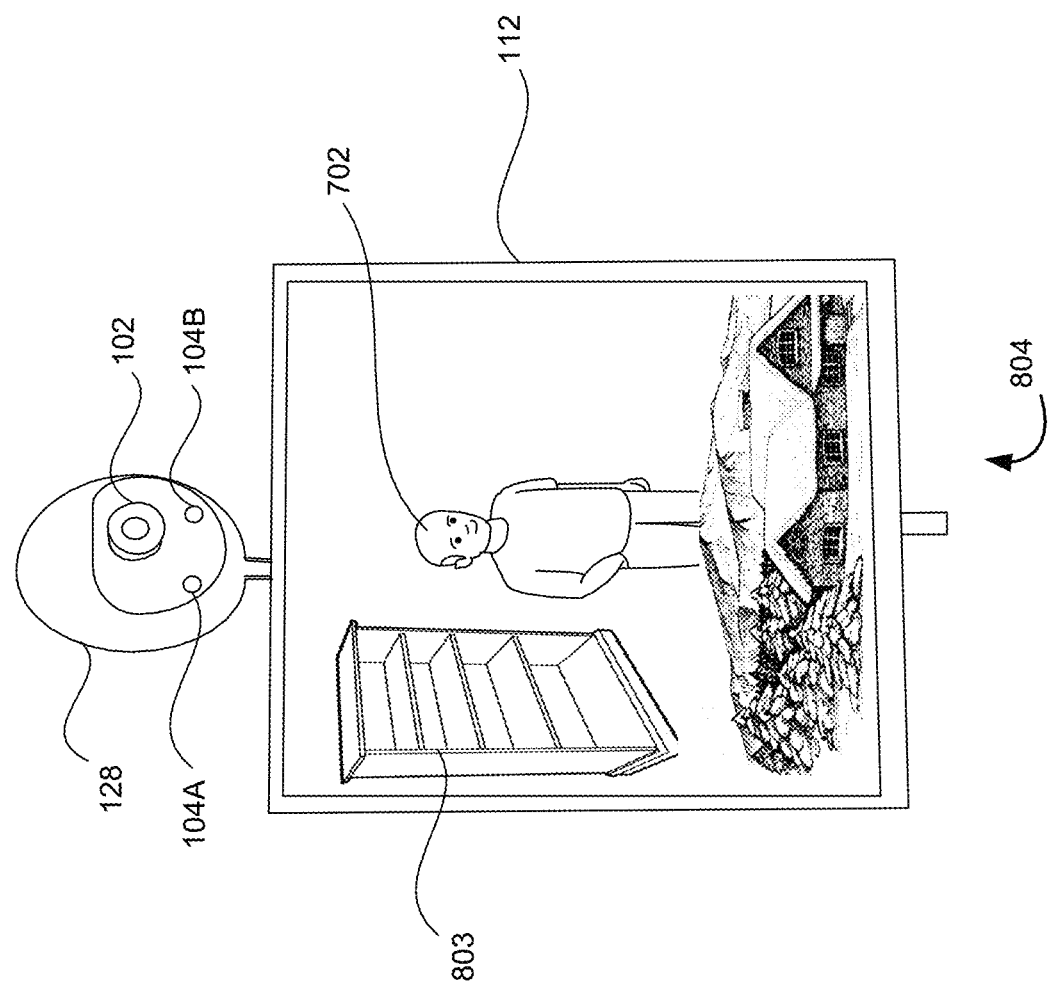

In FIG. 8C, an exemplary planar view 804 that includes the camera 102, the display unit 112, the user 702 and the sensors 104A-B. In some embodiments, if the user 702 moves to the right with respect to the shell 128, the shell 128 moves to maintain focus on the user 702 approximately in the center and captures a live image of the user 702 at a third position. In some embodiments, the control unit 116, as shown in FIG. 1A, detects gestures of the user 702 for the third position using the sensors 104A-B. The control unit 116 applies the at least one environment modification rule that is stored in the environment rules engine 210 to modify the foreground of the live image with the foreground layer, e.g., the natural scenery that is stored in the content database 208 for the third position. As shown in the FIG. 8C, the foreground layer of the live image may be to the right of the natural scenery. In some embodiments, the live image of the user 702 includes a natural background, e.g., a bookshelf 803 that is located to the right of the user 702, as shown in FIG. 8C. In some embodiments, the control unit 116 may slide the foreground layer continuously corresponding to the movement of the user 702. In some embodiments, the control unit 116 may slide the foreground layer in a same direction as a direction of the movement of the user 702. For example, if the user 702 moves to the right from the center of the shell 128, as shown in FIG. 8C, the control unit 116 may move the foreground layer from the left to the right. In some embodiments, the control unit 116 may slide the foreground layer in an opposite direction as the direction of the movement of the user 702. For example, if the user 702 moves to the right from the center of the shell 128, the control unit 116 may move the foreground layer from the right to the left. The control unit 116 displays the modified live image for the third position of the user 702 using the display unit 112.

In some embodiments, the content database 208 includes one or more foreground layers, e.g., the logos, product carousels, panoramic views of venues, team brands, celebrities, animals, cartoon characters etc. In some embodiments, the environment rules engine 210 each foreground layer, e.g., the logos, the product carousels, the panoramic views of venues, the team brands, the celebrities, the animals, the cartoon characters etc. on the live image of the user 702 based on the movement of the user 702. In some embodiments, the environment rules engine 210 continuously slides a specific foreground layer, e.g., a cartoon character and maintains other foreground layers e.g., the logos, the product carousels, the panoramic views of venues, the team brands, the celebrities, etc. stationary on the live image of the user 702.

Figure 8D:
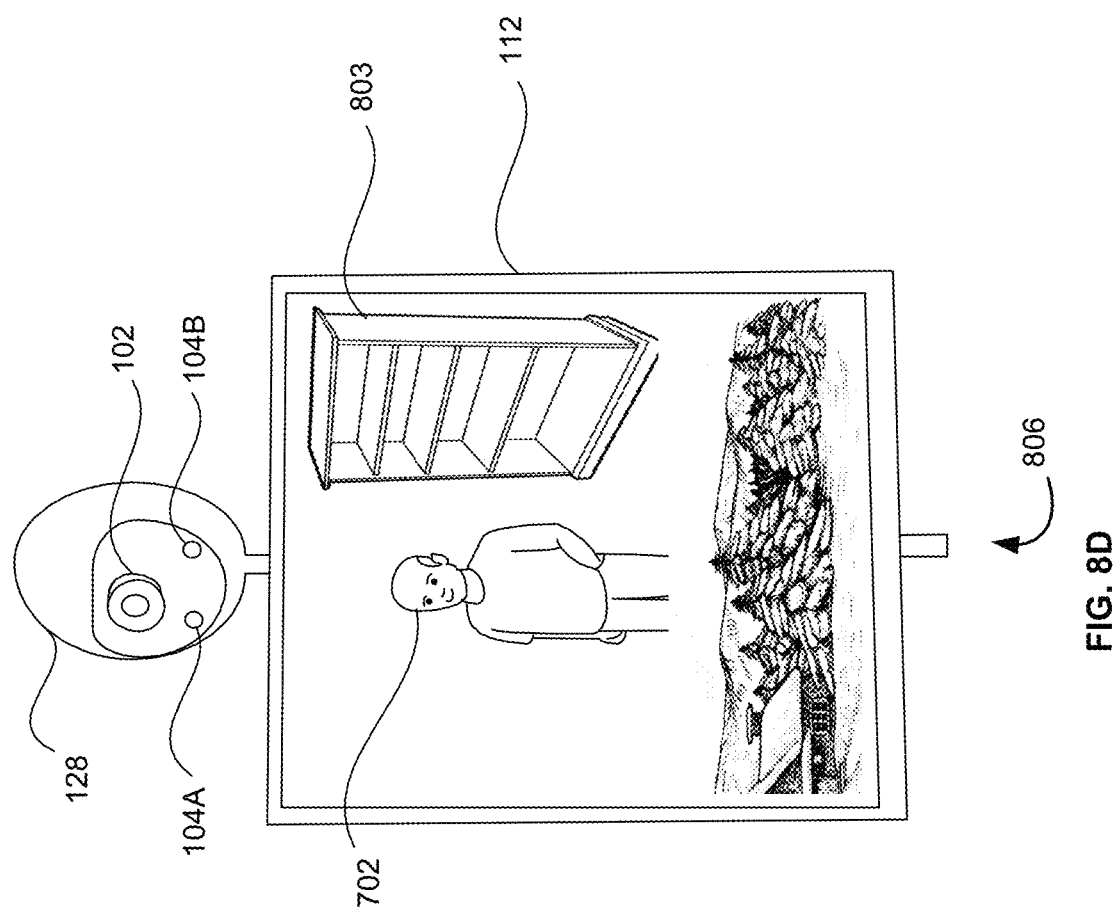

In FIG. 8D, an exemplary planar view 806 that includes the camera 102, the display unit 112, the user 702 and the sensors 104A-B. In some embodiments, if the user 702 moves to the left with respect to the shell 128, the shell 128 moves to maintain focus on the user 702 approximately in the center and captures a live image of the user 702 at a fourth position. The control unit 116, as shown in FIG. 1A, applies the at least one environment modification rule that is stored in the environment rules engine 210 to modify the foreground of the live image with a foreground layer, e.g., a natural scenery that is stored in the content database 208. In some embodiments, the live image of the user 702 includes the background, e.g., the bookshelf 803 which is placed to the left of the user 702, as shown in FIG. 8D. In some embodiments, the control unit 116 may slide the foreground layer continuously corresponding to the movement of the user 702. In some embodiments, the control unit 116 may slide the foreground layer in the same direction (e.g., left to right) as the direction of the movement of the user 702. As shown in the FIG. 8D, the foreground layer of the live image shown on the display unit 112 may be to the left of the natural scenery. The foreground layer may slide continuously corresponding to the movement of the user 702.

Figure 9A:
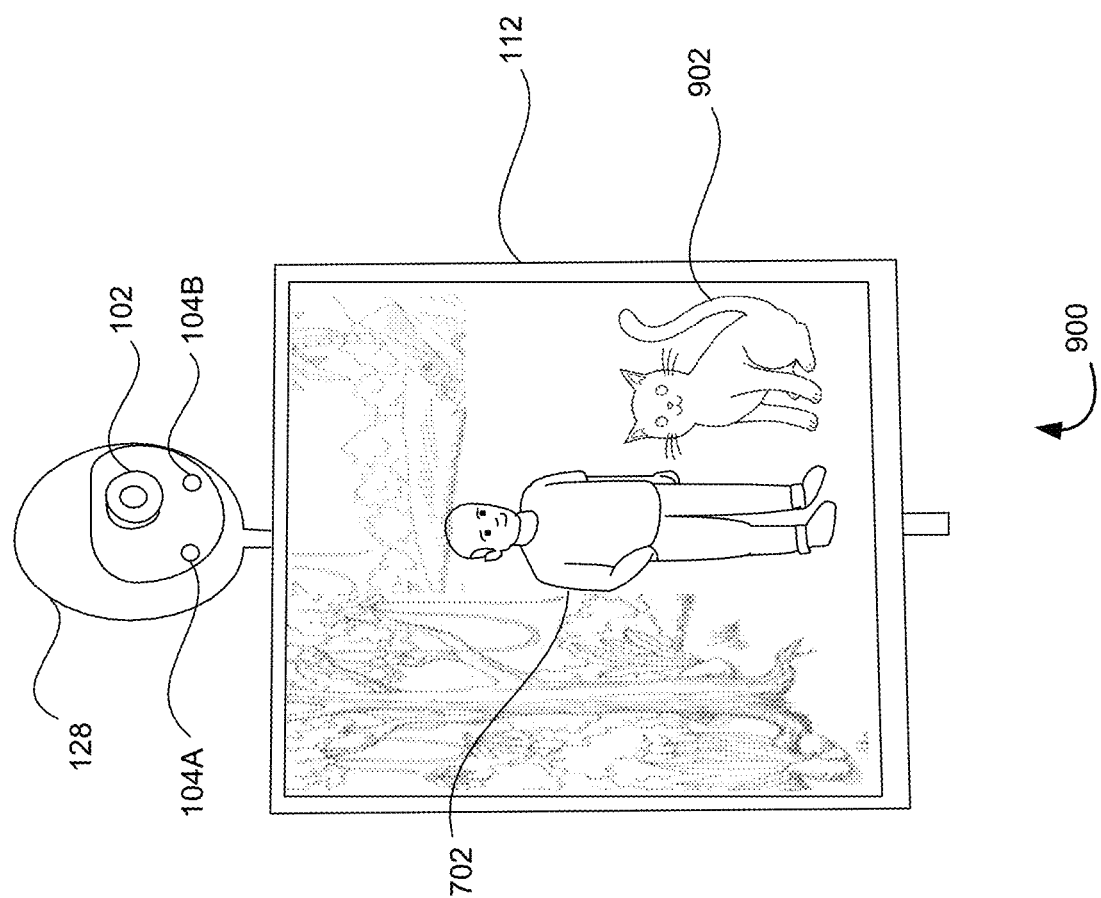
FIGS. 9A-9B are exemplary planar views of capturing the live images of the user and dynamically modifying a background and the foreground on the live images using the automated interactive system of FIG. 1 according to some embodiments herein.
Figure 9B:
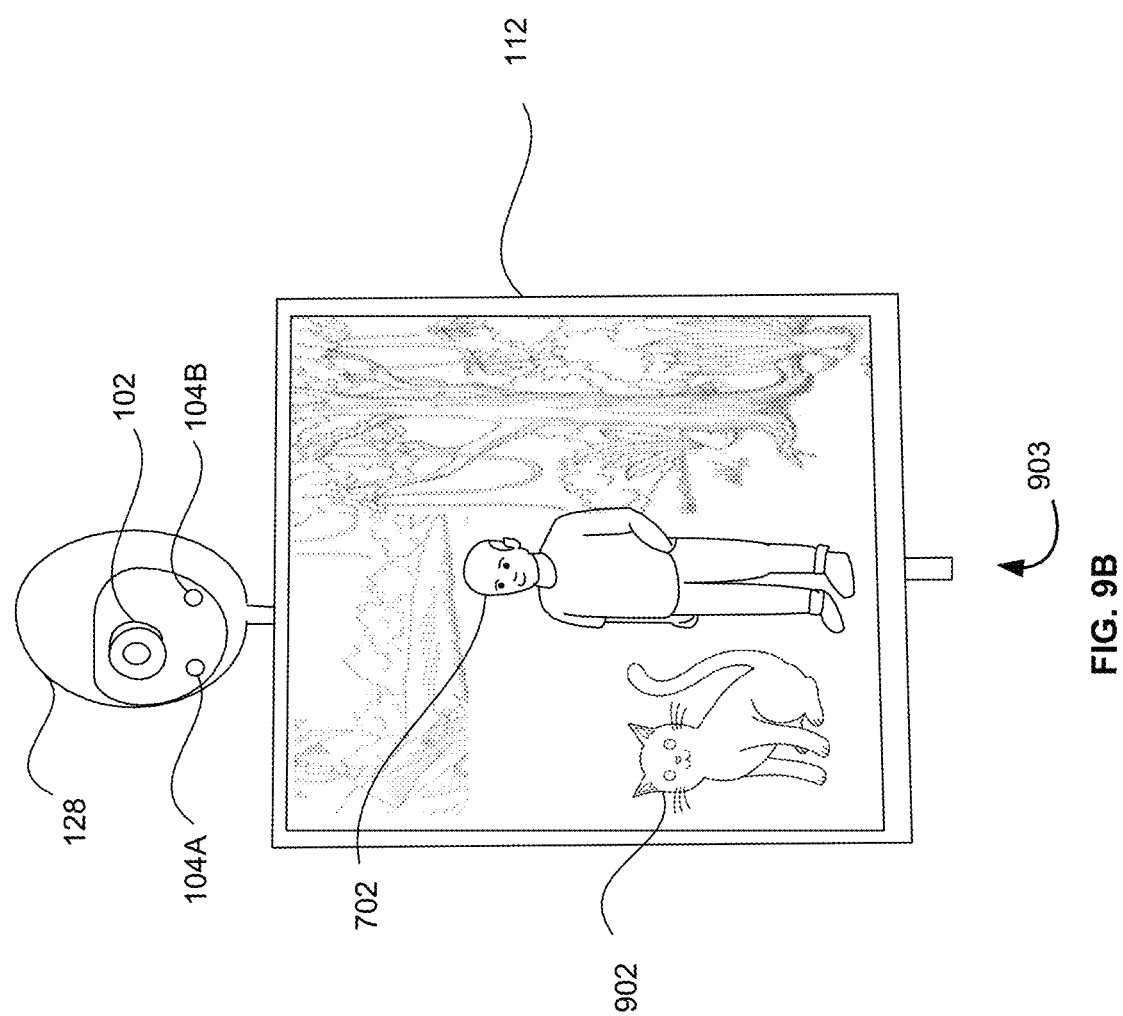

FIGS. 9A-9B are exemplary planar views of capturing live images of the user 702 and dynamically modifying a background and a foreground on the live images using the automated interactive system 100 of FIG. 1 according to some embodiments herein. In FIG. 9A of an exemplary planar view 900 that includes the camera 102, the display unit 112, the user 702 and the sensors 104A-B. In some embodiments, if the user 702 moves to left with respect to the shell 128, the shell 128 moves to maintain focus on the user 702 approximately in center and captures a live image of the user 702 at a first position. In some embodiments, the control unit 116, as shown in FIG. 1A, detects gestures of the user 702 for the first position using the sensors 104A-B. The control unit 116 applies the at least one environment modification rule that is stored in the environment rules engine 210 to modify the live image of the user 702 with a layer for the first position of the user 702. The control unit 116 modifies the background and the foreground with a background layer, e.g., a jungle (as shown in FIG. 9A) and a foreground layer, e.g., a cat's image 902 that are stored in the content database 208 for the first position of the user 702. The control unit 116 may continuously slide the background layer, e.g., the jungle and the foreground layer, e.g., the cat's image 902 corresponding to the movement of the user 702. The control unit 116 displays the modified live image for the first position of the user 702 using the display unit 112. In some embodiments, the foreground layers include one or more images of cartoon characters, e.g., Mickey Mouse, Donald Duck, Tom, Jerry, etc. In some embodiments, if the user 702 wants to capture the live image with the cartoon characters such as the Mickey Mouse, the Donald Duck, Tom and the Jerry, etc., the user 702 has to move in at least one direction with respect to the shell 128. As shown in FIG. 7A, the background layer of the live image may be to the left of the jungle. In some embodiments, the user 702 may select the foreground layer, e.g., the cat's image 902.

In some embodiments, the control unit 116 moves the foreground layer, e.g., the cat's image 902 in a direction that is opposite to the at least one direction of the user 702 and the background layer, e.g., the jungle of the live image of the user, if the user 702 moves in the at least one direction from the center of the frame.

In some embodiments, the control unit 116 moves the foreground layer, e.g., the cat's image 902 in the direction that is same to the at least one direction of the user 702 and the background layer, e.g., the jungle of the live image, if the user 702 moves in the at least one direction from the center of the frame.

In some embodiments, the control unit 116 modifies a zoom level of the foreground layer, e.g., the cat's image 902 and the background layer, e.g., the jungle based on a distance between the user 702 and the camera 102. For example, the control unit 116 displays the live image of the subject with the foreground layer, e.g., the cartoon character such as the Jerry larger when compared to the live image of the user 702 is further away the camera 102.

In FIG. 9B, an exemplary planar view 903 that includes the camera 102, the display unit 112, the user 702 and the sensors 104A-B. In some embodiments, if the user 702 moves to the right with respect to the shell 128, the shell 128 moves to maintain focus on the user 702 approximately in the center and captures a live image of the user 702 at a second position. The control unit 116, as shown in FIG. 1A, applies the at least one environment modification rule that is stored in the environment rules engine 210, as shown in FIG. 2, to modify the live image of the user 702 with a layer that is stored in the environment rules engine 210 for the second position of the user 702. The control unit 116 modifies a background and a foreground of the live image with a background layer, e.g., the jungle (as shown in FIG. 9B) and a foreground layer, e.g., the cat's image 902 that are stored in the content database 208 for the second position of the user 702. The control unit 116 may continuously slide the background layer, e.g., the jungle and the foreground layer, e.g., the cat's image 902 corresponding to the movement of the user 702. As shown in FIG. 9B, the background layer of the live image may be to the right of the jungle.

Figure 10A:
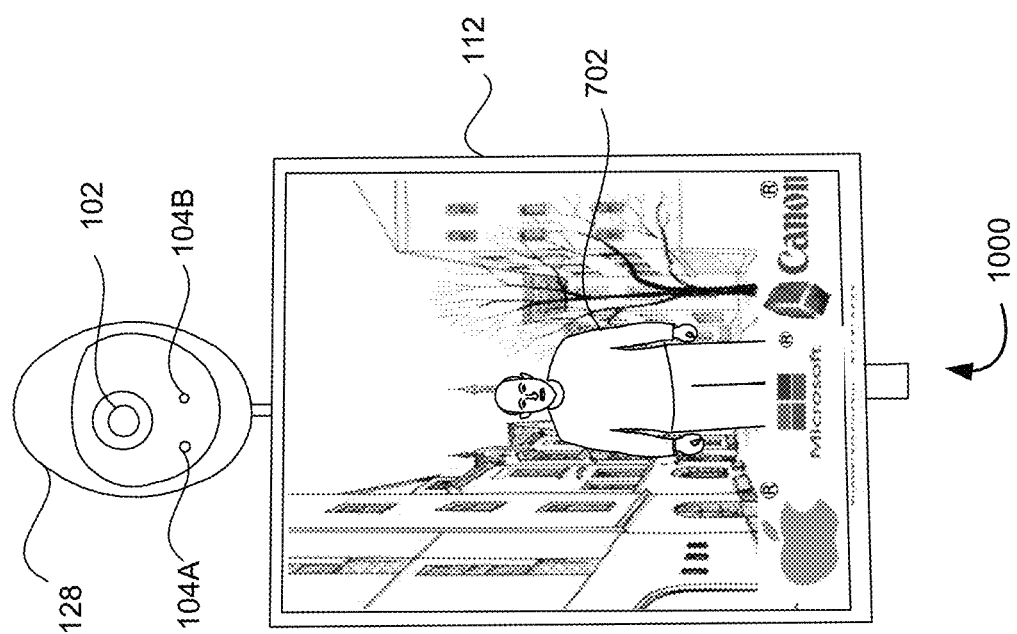
FIGS. 10A-10C are exemplary planar views of capturing the live images of the user and applying the foreground layer on the live images using the automated interactive system of FIG. 1 according to some embodiments herein.
Figure 10B:
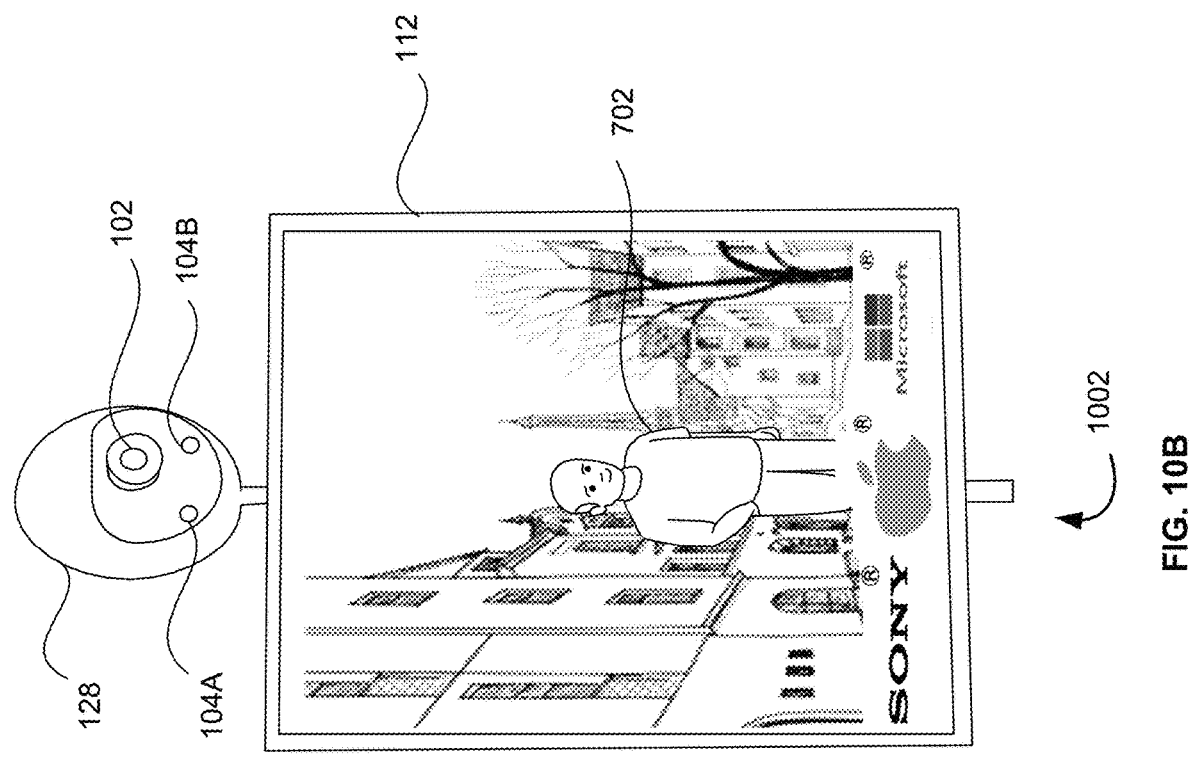
Figure 10C:
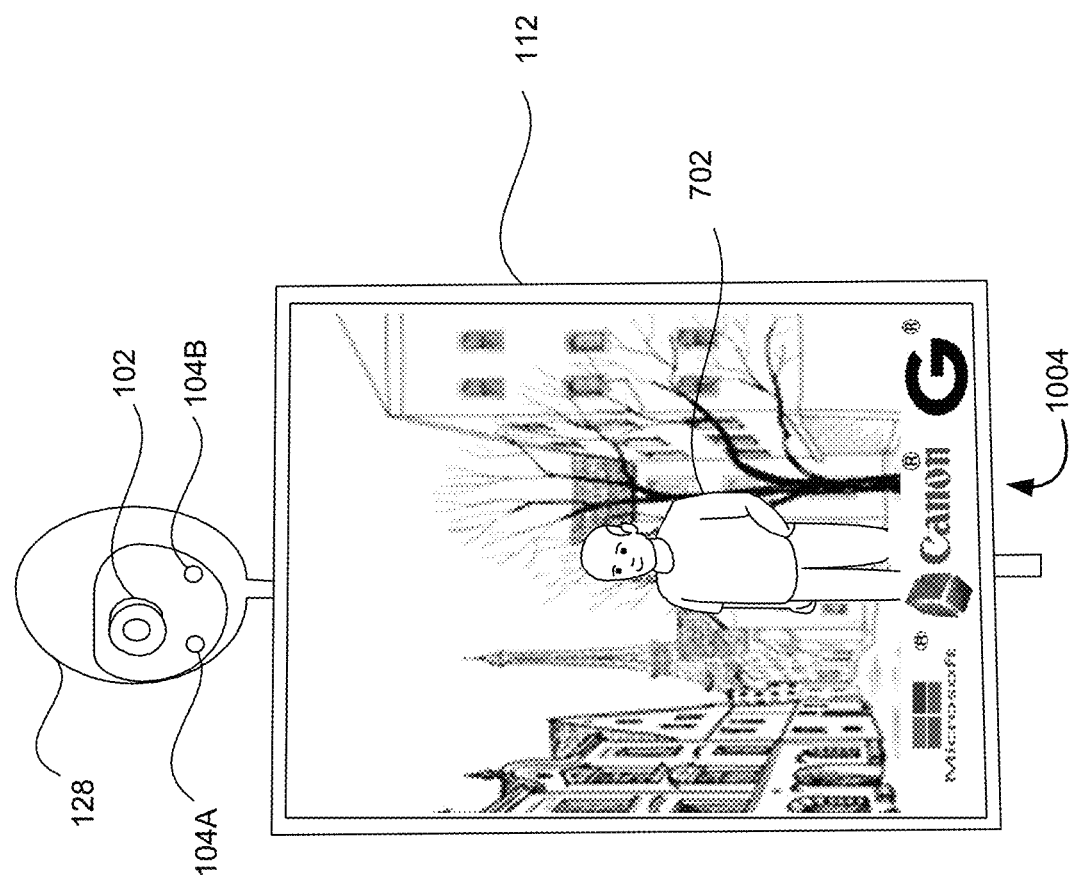

FIGS. 10A-10C are exemplary planar views of capturing the live images of the user 702 and applying a foreground layer on the live images using the automated interactive system 100 of FIG. 1 according to some embodiments herein. In FIG. 10A of an exemplary planar view 1000 that includes the camera 102, the display unit 112, the user 702 and the sensors 104A-B. In some embodiments, if the user 702 in center with respect to the shell 128, the shell 128 maintains focus on the user 702 approximately in the center and captures a live image of the user 702 at a first position.

In some embodiments, the control unit 116, as shown in FIG. 1A, detects gestures of the user 702 for the first position using the sensors 104A-B. The control unit 116 applies at least one environment modification rule that is stored in the environment rules engine 210 to modify a background and a foreground of the live image of the user 702 with a background layer e.g., Eiffel Tower (as shown in FIG. 10A) and a foreground layer e.g., logos such as iPhone®, Microsoft®, Cannon®, etc. that are stored in the content database 208 for the first position of the user 702. The control unit 116 may slide the background layer, e.g., the Eiffel Tower and the foreground layer, e.g., logos such as iPhone®, Microsoft®, Cannon®, etc. continuously corresponding to the movement of the user 702. The control unit 116 displays the modified live image for the first position of the user 702 using the display unit 112. In some embodiments, if the user 702 wants to capture the live image with a logo such as iPhone® in the center, the user 702 has to move in at least one direction with respect to the shell 128. As shown in FIG. 10A, the background layer of the live image may be center of the Eifel Tower. In some embodiments, the user 702 may select the foreground layers, e.g., the logos.

In FIG. 10B, an exemplary planar view 1002 that includes the camera 102, the display unit 112, the user 702 and the sensors 104A-B. In some embodiments, if the user 702 moves to left with respect to the shell 128, the shell 128 moves to maintain focus on the user 702 approximately in center and captures a live image of the user 702 at a second position.

In some embodiments, the control unit 116, as shown in FIG. 1A, detects gestures of the user 702 for the second position using the sensors 104A-B. The control unit 116 applies at least one environment modification rule that is stored in the environment rules engine 210 to modify a background and a foreground of the live image of the user 702 with a background layer e.g., Eiffel Tower (as shown in FIG. 10B) and a foreground layer e.g., logos such as Sony®, iPhone®, Microsoft®, etc. that are stored in the content database 208 for the second position of the user 702. The control unit 116 may slide the background layer, e.g., the Eiffel Tower and the foreground layer, e.g., logos such as Sony®, iPhone®, Microsoft®, etc. continuously corresponding to the movement of the user 702. The control unit 116 displays the modified live image for the second position of the user 702 using the display unit 112. In some embodiments, if the user 702 wants to capture the live image with a logo such as Sony® in the center, the user 702 has to move in at least one direction with respect to the shell 128. As shown in FIG. 10B, the background layer of the live image may be to the left of the Eifel Tower. In some embodiments, the user 702 may select the foreground layers, e.g., the logos.

In FIG. 10C, an exemplary planar view 1004 that includes the camera 102, the display unit 112, the user 702 and the sensors 104A-B. In some embodiments, if the user 702 moves to right with respect to the shell 128, the shell 128 moves to maintain focus on the user 702 approximately in center and captures a live image of the user 702 at a third position.

In some embodiments, the control unit 116, as shown in FIG. 1A, detects gestures of the user 702 for the third position using the sensors 104A-B. The control unit 116 applies at least one preconfigured environment modification rule that is stored in the environment rules engine 210 to modify a background and a foreground of the live image of the user 702 with the layer for the third position of the user 704. The control unit 116 modifies the background and the foreground with a background layer, e.g., Eiffel Tower (as shown in FIG. 10C) and a foreground layer, e.g., logos such as Microsoft®, Canon®, Google®, etc. that are stored in the content database 208 for the third position of the user 702. The control unit 116 may slide the background layer, e.g., the Eiffel Tower and the foreground layer, e.g., the logos such as Microsoft®, Canon®, Google®, etc. continuously corresponding to the movement of the user 702. The control unit 116 displays the modified live image for the third position of the user 702 using the display unit 112. In some embodiments, if the user 702 wants to capture the live image with the logo such as Google® in the center, the user 702 has to move in the at least one direction with respect to the shell 128. As shown in FIG. 10C, the background layer of the live image may be to the right of the Eifel Tower. In some embodiments, the user 702 may select the foreground layers, e.g., the logos.

Figure 11A:
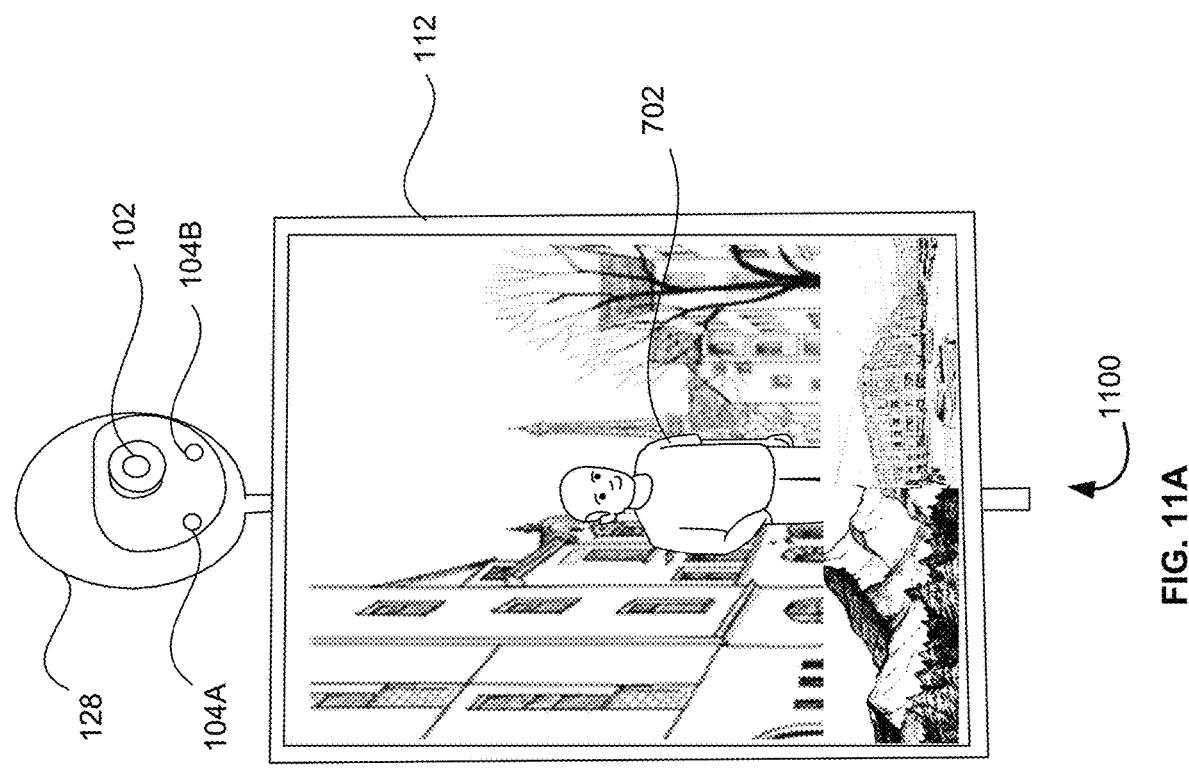
FIGS. 11A-11B are exemplary planar views of capturing the live images of the user and applying the foreground layers on the live images using the automated interactive system of FIG. 1 according to some embodiments herein.
Figure 11B:
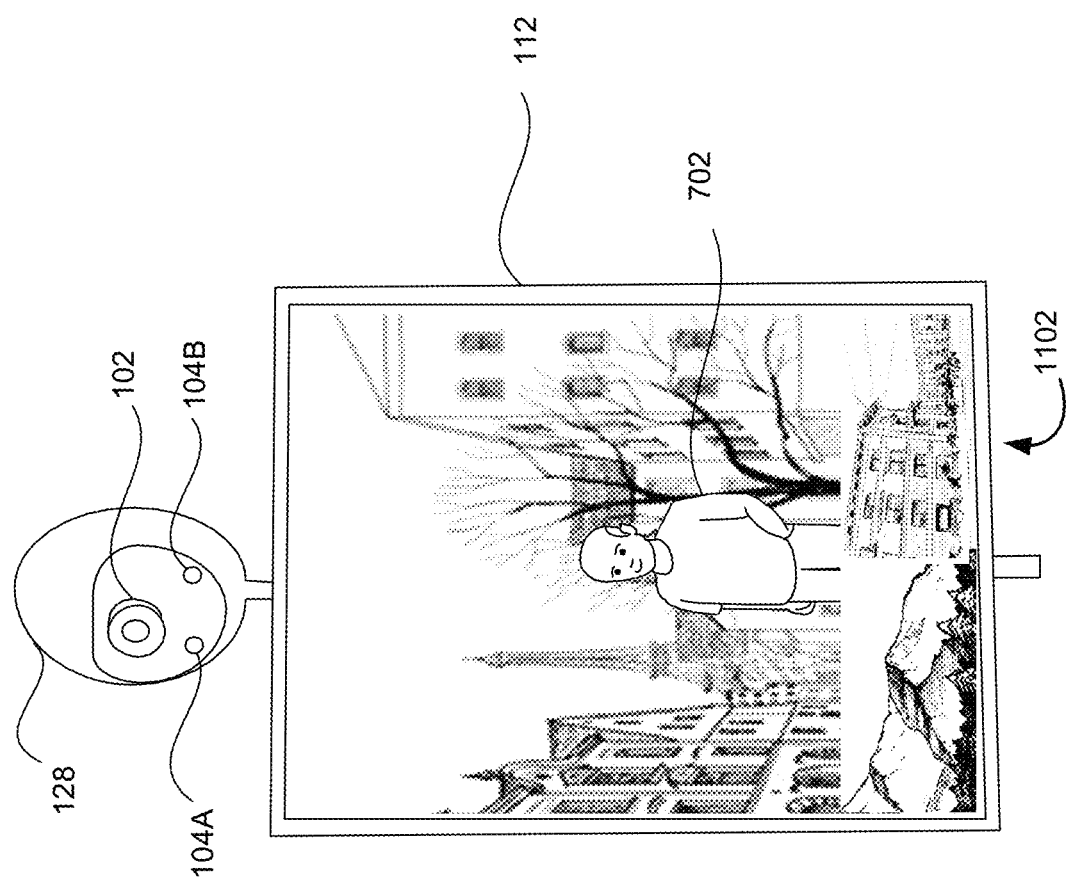

FIGS. 11A-11B are exemplary planar views of capturing the live images of the user and applying one or more foreground layers on the live images using the automated interactive system of FIG. 1 according to some embodiments herein. In FIG. 11A of an exemplary view 1100 that includes the camera 102, the display unit 112, the user 702 and the sensors 104A-B. In some embodiments, if the user 702 moves to left with respect to the shell 128, the shell 128 moves to maintain focus on the user 702 approximately in center and captures a live image of the user 702 at a first position. The control unit 116, as shown in FIG. 1A, applies at least one environment modification rule that is stored in the environment rules engine 210, as shown in FIG. 2, to modify the live image of the user 702 with a layer that includes a background layer e.g., Eiffel Tower (as shown in FIG. 11A) and foreground layer e.g., a natural scenery and a city illustration that are stored in the content database 208 for the first position of the user 702. The control unit 116 may continuously slide the background layer, e.g., the Eiffel Tower and the foreground layers, e.g., the natural scenery and the city illustration corresponding to the movement of the user 702. The control unit 116 displays the modified live image for the first position of the user 702 using the display unit 112. In some embodiments, the control unit 116 may continuously slide the background layer, e.g., the Eiffel Tower and the foreground layers, e.g., the natural scenery and the city illustration in same direction. In some embodiments, the control unit 116 may continuously slide the background layer, e.g., the Eiffel Tower and the foreground layers, e.g., the natural scenery and the city illustration in opposite direction. In some embodiments, the control unit 116 may continuously slide the foreground layers, e.g., the natural scenery and the city illustration in same direction. In some embodiments, the control unit 116 may continuously slide the foreground layers, e.g., the natural scenery and the city illustration in opposite direction.

In FIG. 11B, an exemplary planar view 1102 that includes the camera 102, the display unit 112, the user 702 and the sensors 104A-B. In some embodiments, if the user 702 moves to right with respect to the shell 128, the shell 128 moves to maintain focus on the user 702 approximately in center and captures a live image of the user 702 at a second position. The control unit 116, as shown in FIG. 1A, applies at least one environment modification rule that is stored in the environment rules engine 210 to modify the live image of the user 702 with the layer for the second position of the user 704. The control unit 116 modifies a background and a foreground of the live image with a background layer, e.g., Eiffel Tower (as shown in FIG. 11B) and the foreground layers, e.g., the natural scenery and the city illustration. that are stored in the content database 208 for the second position of the user 702. The control unit 116 may slide the background layer, e.g., the Eiffel Tower and the foreground layers, e.g., the natural scenery and the city illustration continuously corresponding to the movement of the user 702. The control unit 116 displays the modified live image for the second position of the user 702 using the display unit 112. As shown in the FIG. 11B, the background layer of the live image may be to the right of the Eifel Tower. As shown in FIG. 11B, the foreground layers of the live image may be to the right of the natural scenery and the city illustration.

Figure 12:
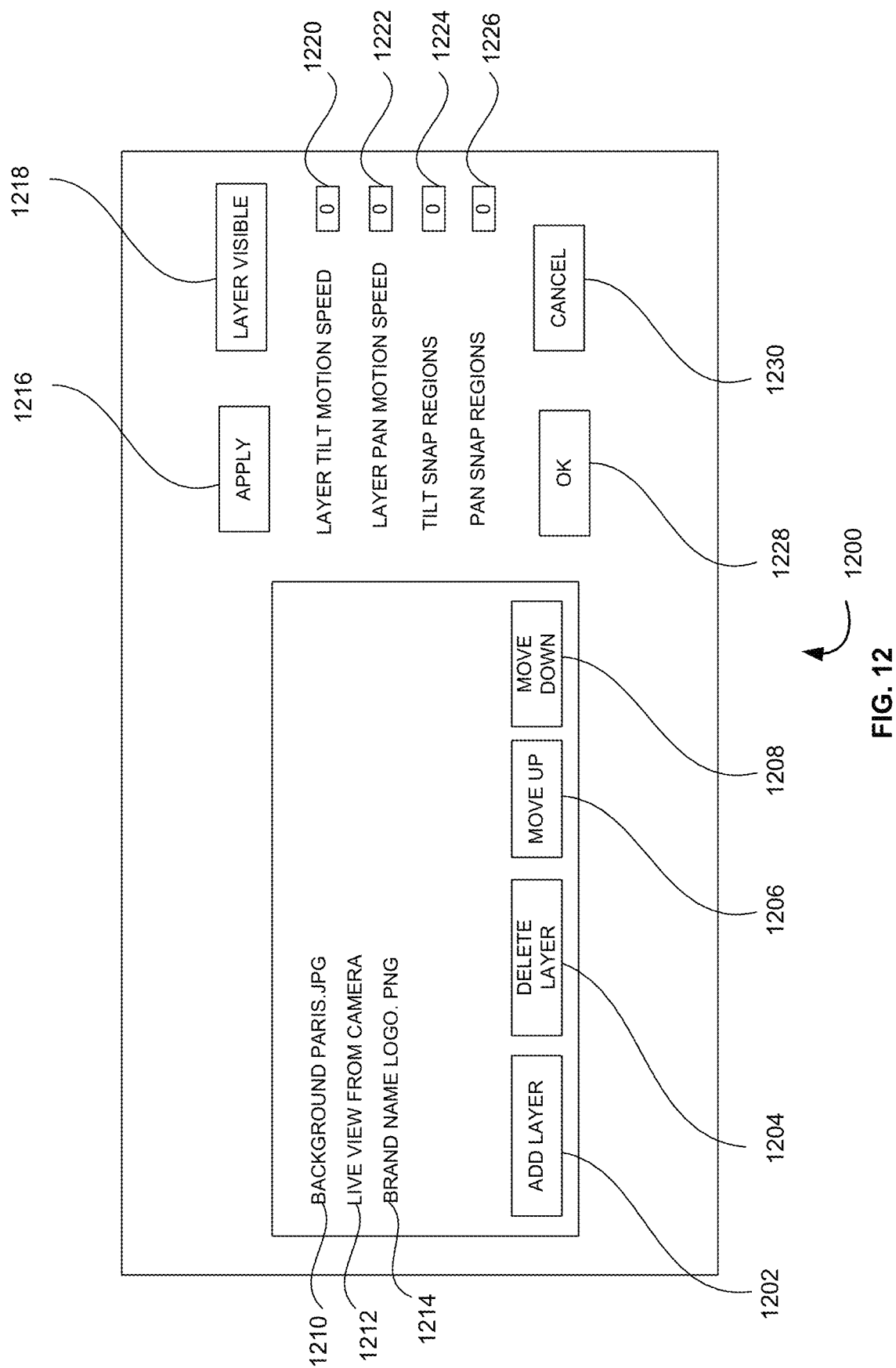
FIG. 12 is a mock-up screenshot of a user interface of the automated interactive system according to some embodiments herein.

FIG. 12 is a mock-up screenshot of a user interface 1200 of the automated interactive system 100 according to some embodiments herein. In some embodiments, a user may add background layers and foreground layers using add layer 1202. For example, the user may add the background layers and the foreground layers such as a Background Paris. JPG 1210 (as described herein), a Live View from Camera 1212 and a Brand name Logo.PNG 1214. The user may remove the background layers and the foreground layers using remove layer 1204. In some embodiments, the user may change a priority order of the background layers and the foreground layers using move up 1206 and move down 1208. The control unit 116, as shown in FIG. 1A, may display the background layers and the foreground layers selected by the user thorough the display unit 112. In some embodiments, the user may change a layer setting of at least one of (i) the background layers and (ii) the foreground layers using layer visible 1218. In some embodiments, the layer setting is selected from at least one of (i) Layer Tilt Motion Speed 1220, (ii) Layer Pan Motion Speed 1222, (iii) Tilt Snap Regions 1224 and (iv) Pan Snap Regions 1226. In some embodiments, an operator, an administrator or the user may apply the layer setting using apply 1216. In some embodiments, the layer tilt motion speed 1220 determines how quickly the background layers and the foreground layers are scrolled up or down corresponds to tilting up or down of the camera 102. For example, each vertical degree of the camera's 102 tilt, the control unit 116 scrolls at least one of (ii) the background layers and (ii) the foreground layers by 25 pixels. In some embodiments, a sign of this value indicates a direction of motion of the at least one of (ii) the background layers and (ii) the foreground layers. For example, if the user may provide a positive number, e.g., +1, at least one of the background layers and (ii) the foreground layers are scrolled in a direction that is same as the direction of the camera 102. In some embodiments, if the user provides a negative number, e.g., −1, at least one of the background layers and (ii) the foreground layers is scrolled in the direction that is opposite to the direction of the camera 102.

The layer pan motion speed 1222 determines horizontal rotation speed and direction of at least one of (i) the background layers and (ii) the foreground layers are scrolled left or right corresponds to turning left or right of the camera 102. In some embodiments, if the operator provides large positive numbers, e.g., +5, at least one of (i) the background layers and (ii) the foreground layers are scrolled fast in the display unit 112 in the direction in which user 702 on FIG. 11A moves across the horizontal plane on the natural scene. In some embodiments, if the operator provides smaller positive numbers, e.g., +1, at least one of (i) the background layers and (ii) the foreground layers are scrolled slow in in the display unit 112 in the direction in which user 702 on FIG. 11A moves across the horizontal plane on the natural scene. In some embodiments, if the operator provides large negative numbers, e.g., −5, at least one of (i) the background layers and (ii) the foreground layers are scrolled fast on the display unit 112 in the direction that is opposite to the direction in which user 702 on FIG. 11A moves across the horizontal plane on the natural scene. In some embodiments, if the operator provides smaller negative numbers, e.g., −1, at least one of (i) the background layers and (ii) the foreground layers are scrolled slower on the display unit 112 in the direction that is opposite to the direction in which user 702 on FIG. 11A moves across the horizontal plane on the natural scene.

In some embodiments, instead of moving at least one of (i) the background layers and (ii) the foreground layers smoothly based on the camera's 102 motion, the tilt snap regions 1224 are enabled to move at least one of (i) the background layers and (ii) the foreground layers in vertical direction when a subject, e.g., the user crosses a predetermined threshold. In some embodiments, if the tilt snap regions 1224 are enabled by the operator, there is no "in between" position for the background layers and the foreground layers. In some embodiments, the background layers and the foreground layers may appear to "jump" when the subject, e.g., the user crosses the predetermined threshold. In some embodiments, instead of moving at least one of (i) the background layers and (ii) the foreground layers smoothly based on the camera's 102 motion, the pan snap regions 1226 are enabled to move at least one of (i) the background layers and (ii) the foreground layers in the horizontal direction when the subject, e.g., the user crosses the predetermined threshold. The user may select Ok 1228 or Cancel 1230 to select or cancel ranges selected for at least one of (i) the Layer Tilt Motion Speed 1220, (ii) the Layer Pan Motion Speed 1222, (iii) the Tilt Snap Regions 1224 and (iv) the Pan Snap Regions 1226.

Figure 13:
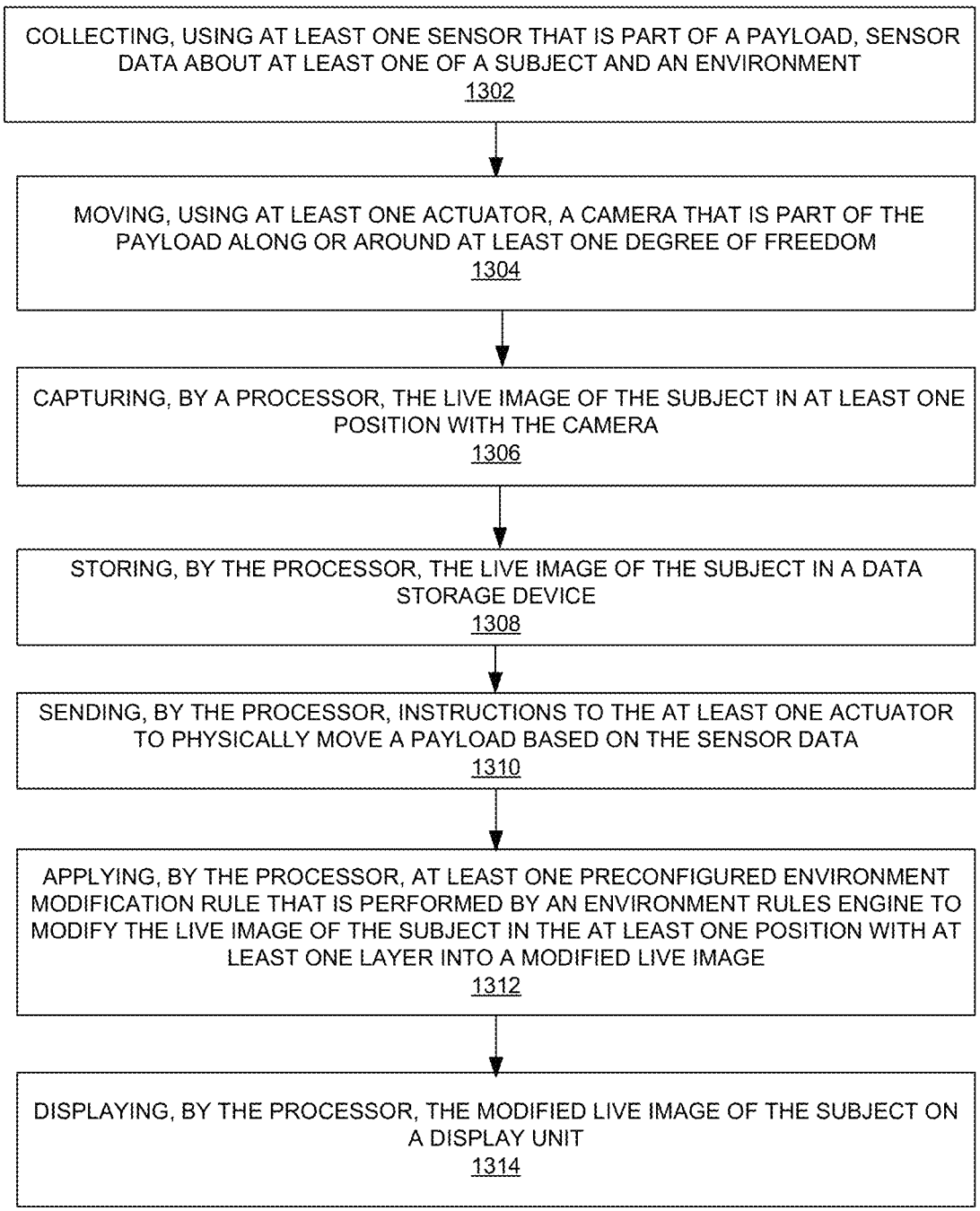
FIG. 13 is a flow chart that illustrates a method for dynamically modifying a live image of a subject using an automated interactive system of FIG. 1 according to some embodiments herein.

FIG. 13 is a flow chart that illustrates a method 1300 for dynamically modifying a live image of a subject using the automated interactive system 100 of FIG. 1 according to some embodiments herein. At step 1302, the method 1300 includes collecting, using at least one sensor that is part of a payload, sensor data about at least one of the subject and an environment. e.g., At step 1304, the method 1300 includes moving, using at least one actuator, the camera 102 that is part of the payload along or around at least one degree of freedom that is selected from at least one of (i) rotating the camera 102 around horizontal axis, (ii) rotating the camera 102 around vertical axis, (iii) moving the camera 102 parallel to the vertical axis, and (iv) moving the camera 102 parallel to the horizontal axis. At step 1306, the method 1300 includes capturing, by a processor, the live image of the subject in the at least one position with the camera 102. At step 1308, the method 1300 includes storing the live image of the subject in a data storage device. At step 1310, the method 1300 includes sending, by the processor, instructions to the at least one actuator to physically move a payload based at least in part on the sensor data. At step 1312, the method 1300 includes applying, by the processor, at least one environment modification rule that is stored in the environment rules engine 210 to modify the live image of the subject in the at least one position with at least one layer that is stored in the content database 208 into a modified live image. At step 1314, the method 1300 includes displaying, by the processor, the modified live image of the subject on the display unit 112.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
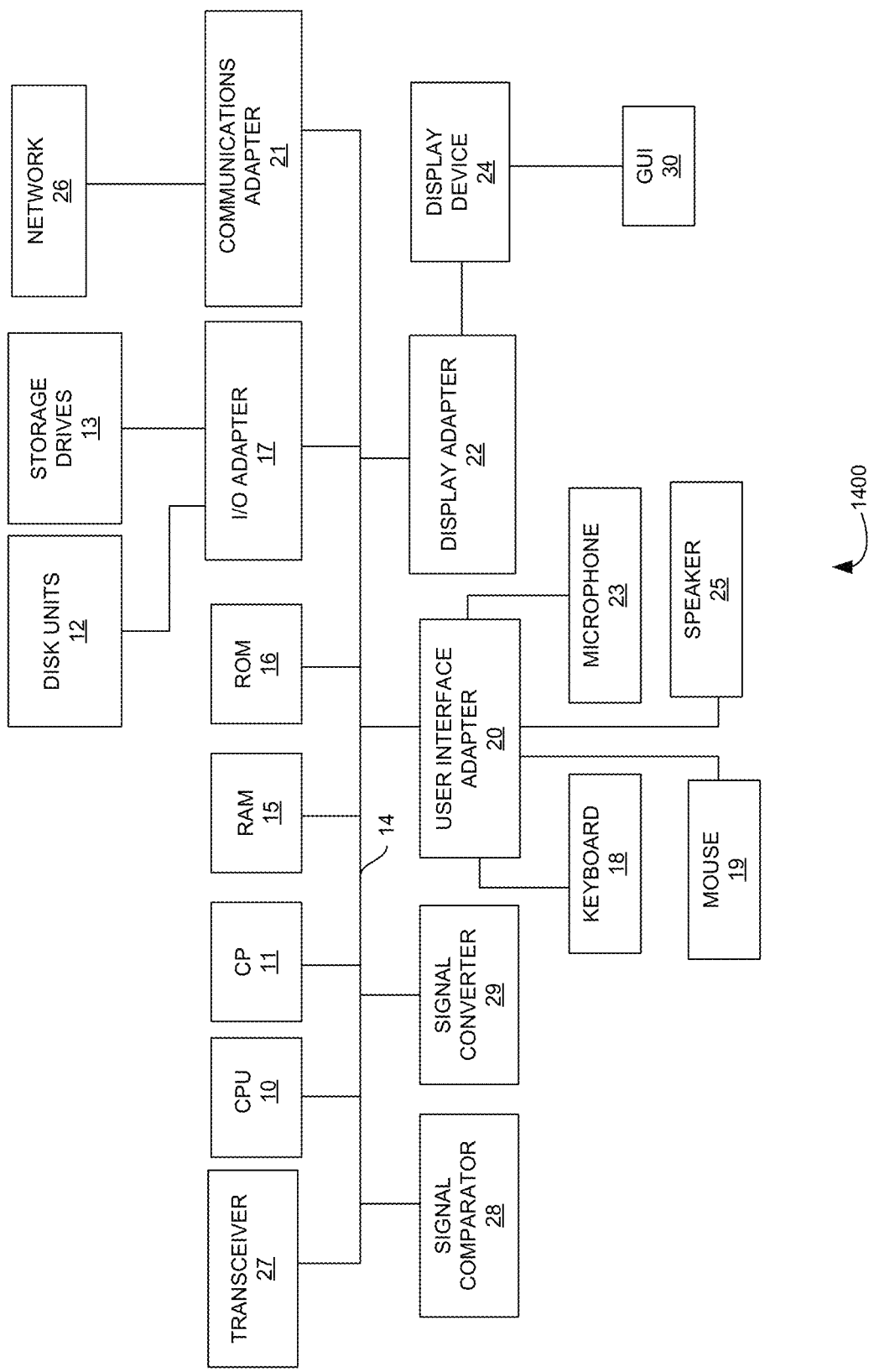
FIG. 14 is a block diagram of a device used in accordance with embodiments herein.

A representative hardware environment for practicing the embodiments herein is depicted in FIG. 14, with reference to FIGS. 1 through 13. This schematic drawing illustrates a hardware configuration of a server/computer system/user device in accordance with the embodiments herein. The server includes at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The server can read the inventive instructions on the program storage devices and follow these instructions to execute the methodology of the embodiments herein. The server further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An automated interactive system for dynamically modifying a live image of a subject, the automated interactive system comprising:
  a motorized platform, wherein the motorized platform includes
    at least one actuator that is capable of rotating or translating a payload comprising at least one sensor and a camera, wherein the at least one sensor is adapted to collect sensor data about at least one of the subject and an environment, wherein the camera is adapted to capture the live image of the subject in an at least one position,
    wherein the at least one actuator moves the camera along or around at least one degree of freedom that is selected from at least one of (i) rotating the camera around horizontal axis, (ii) rotating the camera around vertical axis, (iii) moving the camera parallel to the vertical axis, and (iv) moving the camera parallel to the horizontal axis; and
  a control unit that comprises a processor and a physical data storage device containing computer-executable instructions that, when executed by the processor, cause the processor to;
    capture the live image of the subject in the at least one position with the camera;
    store the live image of the subject in the physical data storage device;
    send instructions to the at least one actuator to physically move the payload based at least in part on the sensor data;
    apply at least one environment modification rule that is performed by an environment rules engine to dynamically modify the live image of the subject in the at least one position with an at least one layer into a modified live image,
    wherein the at least one layer is at least one of (i) a background layer and (ii) a foreground layer of the live image of the subject in the at least one position,
    wherein the instructions cause the processor to change a priority order of the background layer and the foreground layer on the live image of the subject based at least in part on the sensor data comprises the distance of the subject from the camera; and display the modified live image of the subject on a display unit.

2. The automated interactive system of claim 1, wherein the processor causes the display unit to display the at least one foreground layer that was previously on top of the live image of the subject as the at least one background layer if the distance of the subject detected by the at least one sensor is less from the camera.

3. An automated interactive system for dynamically modifying a live image of a subject, the automated interactive system comprising:

a motorized platform, wherein the motorized platform includes at least one actuator that is capable of rotating or translating a payload comprising at least one sensor and a camera, wherein the at least one sensor is adapted to collect sensor data about at least one of the subject and an environment, wherein the camera is adapted to capture the live image of the subject in an at least one position, wherein the at least one actuator moves the camera along or around at least one degree of freedom that is selected from at least one of (i) rotating the camera around horizontal axis, (ii) rotating the camera around vertical axis, (iii) moving the camera parallel to the vertical axis, and (iv) moving the camera parallel to the horizontal axis; and a control unit that comprises a processor and a physical data storage device containing computer-executable instructions that, when executed by the processor, cause the processor to;

capture the live image of the subject in the at least one position with the camera;

store the live image of the subject in the physical data storage device;

send instructions to the at least one actuator to physically move the payload based at least in part on the sensor data;

apply at least one environment modification rule that is performed by an environment rules engine to dynamically modify the live image of the subject in the at least one position with an at least one layer into a modified live image, wherein the instructions cause the processor to dynamically move the at least one layer relative to the live image based on the position of the subject in a physical environment while using the motorized platform to maintain at least a portion of the live image of the subject in the center of a live view; and display the modified live image of the subject on a display unit.

4. The automated interactive system of claim 3, wherein the instructions cause the processor to dynamically apply a digital zoom to the at least one layer based on the distance of the subject from the camera while using the motorized platform to maintain at least a portion of the live image of the subject in the center of a live view.

5. The automated interactive system of claim 3, wherein the at least one layer supports a scale mapping function, wherein the scale mapping function decides which portion of the at least one layer is displayed on the live image.

6. The automated interactive system of claim 3, wherein if the subject moves in at least one direction on a physical scene, the processor moves in the at least one degree of freedom of the motorized platform to track the subject and maintain at least of portion of the live image of the subject in the center of the frame and move the at least one layer in a direction that is opposite to the direction of the subject.

7. The automated interactive system of claim 3, wherein if the subject moves in the at least one direction on the physical scene, the processor moves in the at least one degree of freedom of the motorized platform to track the subject and maintain at least of portion of the live image of the subject in the center of the frame and move the at least one layer in same direction of the subject.

8. The automated interactive system of claim 3, wherein display of the at least one layer is controlled by a layer setting selected from at least one of (i) layer tilt motion speed and (ii) layer pan motion speed.

9. The automated interactive system of claim 3, wherein the environment rules engine continuously slides each layer on the live image of the subject.

10. The automated interactive system of claim 9, wherein the environment rules engine continuously slides a specific layer and maintains other layers stationary on the live image of the subject.

11. The automated interactive system of claim 3, wherein the camera and the at least one sensor are mounted on a shell that is controlled using the at least one actuator, and wherein the instructions cause the processor to determine a modality of operation of the camera based on at least one of (i) a position of the shell and (i) a subject's position, wherein the modality of operation comprises capturing at least one of (i) a still photo and (ii) a video of the subject.

12. The automated interactive system of claim 3, wherein if the subject moves away from the center of the frame across the horizontal axis, the control unit turns the camera and the payload in the at least one direction using a pan actuator to maintain at least of portion of the live image of the subject in the center of the frame based at least in part on the sensor data from the at least one sensor.

13. The automated interactive system of claim 3, wherein if the subject moves away from the center of the frame across the vertical axis, the control unit turns the camera and the payload based at least in part on the sensor data from the at least one sensor using the tilt actuator to maintain the subject's face at a predetermined distance from a top of the frame.

14. The automated interactive system of claim 3, wherein the instructions cause the processor to determine a speed of scrolling of a layer image on the live image based on at least one pixel dimension of the layer image corresponding to the at least one layer.

15. The automated interactive system of claim 3, wherein the environment rules engine applies the at least one layer to the live image by, identifying the subject in the live image of the subject;

determining pixels that correspond to the subject in the live image of the subject;

determining pixels that correspond to the environment in the live image;

removing or replacing the pixels corresponding to the environment of the live image without removing the pixels corresponding to the subject using at least one Artificial Intelligence (AI) enabled background removal technique or a Chroma Keying background replacement technique; and applying the at least one layer on the live image of the subject.

16. The automated interactive system of claim 15, wherein the environment rules engine applies the at least one layer on top of pixels that corresponds to at least one of (i) a background and (ii) a foreground of the live image of the subject.

17. The automated interactive system of claim 16, wherein the modified live image comprises at least one of (i) the foreground layer applied on the foreground of the subject, (ii) a live view layer that corresponds to the subject and (iii) the background layer applied on the background of the subject, wherein the foreground layer, the live view layer and the background layer are stacked on top of each other.

18. An automated interactive system for dynamically modifying a live image of a subject, the automated interactive system comprising:
  a motorized platform, wherein the motorized platform includes
    at least one actuator that is capable of rotating or translating a payload comprising at least one sensor and a camera, wherein the at least one sensor is adapted to collect sensor data about at least one of the subject and an environment, wherein the camera is adapted to capture the live image of the subject in an at least one position,
    wherein the at least one actuator moves the camera along or around at least one degree of freedom that is selected from at least one of (i) rotating the camera around horizontal axis, (ii) rotating the camera around vertical axis, (iii) moving the camera parallel to the vertical axis, and (iv) moving the camera parallel to the horizontal axis; and
  a control unit that comprises a processor and a physical data storage device containing computer-executable instructions that, when executed by the processor, cause the processor to;
    capture the live image of the subject in the at least one position with the camera;
    store the live image of the subject in the physical data storage device;
    send instructions to the at least one actuator to physically move the payload based at least in part on the sensor data;
    apply at least one environment modification rule that is performed by an environment rules engine to dynamically modify the live image of the subject in the at least one position with an at least one layer into a modified live image,
      wherein the at least one layer comprises at least one layer mapping function that maps the subject's position in a physical environment to a position of the at least one layer on a screen of the display unit; and
    display the modified live image of the subject on a display unit.

19. The automated interactive system of claim 18, wherein the at least one layer mapping function maintains the at least one layer on the screen of the display unit for at least one of (i) a predetermined time and (ii) a predetermined number of photo shooting sessions.

20. The automated interactive system of claim 18, wherein if the subject crosses a predetermined threshold on the physical scene, the at least one layer mapping function displays the at least one layer on the screen of the display unit by at least one of (i) scrolling the at least one layer, and (ii) hiding the at least one layer by displaying a second layer instead of the at least one layer.

* * * * *